(12) United States Patent
Dixon et al.

(10) Patent No.: US 10,805,198 B2
(45) Date of Patent: Oct. 13, 2020

(54) TECHNIQUES FOR INFRASTRUCTURE ANALYSIS OF INTERNET-BASED ACTIVITY

(71) Applicant: RiskIQ, Inc., San Francisco, CA (US)

(72) Inventors: Brandon Dixon, San Francisco, CA (US); Stephen Ginty, Memphis, TN (US)

(73) Assignee: RiskIQ, Inc., San Francisco, CA (US)

( * ) Notice: Subject to any disclaimer, the term of this patent is extended or adjusted under 35 U.S.C. 154(b) by 0 days.

(21) Appl. No.: 15/398,295

(22) Filed: Jan. 4, 2017

(65) Prior Publication Data

US 2017/0195439 A1    Jul. 6, 2017

Related U.S. Application Data

(60) Provisional application No. 62/274,741, filed on Jan. 4, 2016, provisional application No. 62/309,937, filed on Mar. 17, 2016.

(51) Int. Cl.
| | |
|---|---|
| *H04L 12/26* | (2006.01) |
| *H04L 29/12* | (2006.01) |
| *H04L 29/06* | (2006.01) |
| *G06F 21/55* | (2013.01) |
| *G06F 21/56* | (2013.01) |

(52) U.S. Cl.
CPC ........ *H04L 43/0876* (2013.01); *G06F 21/552* (2013.01); *G06F 21/56* (2013.01); *H04L 61/1511* (2013.01); *H04L 61/2007* (2013.01); *H04L 63/1416* (2013.01)

(58) Field of Classification Search
CPC . H04L 67/22; H04L 43/0876; H04L 61/1511; H04L 61/2007; H04L 67/02

USPC ........................................................ 709/224
See application file for complete search history.

(56) References Cited

U.S. PATENT DOCUMENTS

| | | | |
|---|---|---|---|
| 6,470,386 B1 * | 10/2002 | Combar | G06F 11/0709 705/40 |
| 8,806,626 B2 | 8/2014 | Gardner | |
| 8,832,832 B1 * | 9/2014 | Visbal | H04L 63/1441 726/22 |

(Continued)

FOREIGN PATENT DOCUMENTS

WO         2015113036         7/2015

OTHER PUBLICATIONS

U.S. Appl. No. 62/274,741, filed Jan. 4, 2016.

(Continued)

*Primary Examiner* — Joseph L Greene
(74) *Attorney, Agent, or Firm* — Wong & Rees LLP

(57) ABSTRACT

Some embodiments are directed to techniques for infrastructure analysis of Internet-based activity. Techniques are disclosed to enable analysts to spend more time focusing on analyzing and identifying threats to in a network infrastructure, and little time on data collection and data processing. Specifically, techniques are described for identifying network data relevant to Internet activity and providing an interactive interface (e.g., a "heat map" interface) for viewing and interactive analysis of the network data. The network data may be identified for assessing Internet activity with respect to one or more attributes, such as an Internet domain name or an Internet protocol (IP) address.

22 Claims, 28 Drawing Sheets

(56) References Cited

U.S. PATENT DOCUMENTS

| | | | |
|---|---|---|---|
| 9,043,894 B1* | 5/2015 | Dennison | G06F 21/552 726/11 |
| 9,100,428 B1 | 8/2015 | Visbal | |
| 9,172,716 B2 | 10/2015 | Mugali, Jr. et al. | |
| 10,044,736 B1* | 8/2018 | Barger | H04L 63/14 |
| 10,454,963 B1* | 10/2019 | Smith | G06F 16/2477 |
| 2008/0028463 A1 | 1/2008 | Dagon et al. | |
| 2008/0208820 A1* | 8/2008 | Usey | G06F 17/30616 |
| 2012/0084860 A1* | 4/2012 | Cao | H04L 63/1441 726/23 |
| 2012/0166458 A1* | 6/2012 | Laudanski | H04L 51/12 707/755 |
| 2013/0117282 A1 | 5/2013 | Mugali, Jr. et al. | |
| 2014/0019461 A1 | 1/2014 | Bredenberg et al. | |
| 2014/0059208 A1 | 2/2014 | Yan et al. | |
| 2014/0059433 A1* | 2/2014 | Ady | H04L 43/045 715/719 |
| 2016/0094431 A1* | 3/2016 | Hall | G06F 16/282 709/224 |
| 2016/0197803 A1* | 7/2016 | Talbot | H04L 43/08 709/224 |

OTHER PUBLICATIONS

U.S. Appl. No. 62/309,937, filed Mar. 17, 2016.
5 Ways to Monitor DNS Traffic for Security Threats, Dark Reading, Retrieved from the internet: http://www.darkreading.com/analytics/threat-intelligence/5-ways-to-monitor-dns-traff., Jan. 7, 2016, 9 pages.
Big Data Analytics—Damballa, Retrieved from the internet: https://www.damballa.com/products-solutions/big-data-analytics/, Jan. 7, 2016, 5 pages.
Building a Traffic Heatmap with Google Analytics and R, Retrieved from the internet: https://viget.com/inspire/how-to-build-a-traffic-heatmap-using-google-analytics-and-r, May 14, 2013, 13 pages.
Common Information Model Add-on Manual, Network Resolution (DNS)—Splunk Knowledgebase, Retrieved from the internet: http://docs.splunk.com/Documentation/CIM/4.3.1/User/NetworkResolutionDNS, Jan. 7, 2016, 3 pages.
DNS Analytics for Splunk, Retrieved from the internet: https://splunkbase.splunk.com/app/1657/, Jan. 7, 2016, 7 pages.
How to Get the Most out of DNS in an Active Directory Environment, Infoblox Control Your Network, White Paper, May 2014, 21 pages. SECURED.
HP ArcSight DNS Malware Analytics, Data sheet Copyright 2015, Aug. 2015, 2 pages.
HPE Security ArcSight DNS Malware Analytics (DMA), Hewlett Packard Enterprise Copyright 2015-2016, Jan. 7, 2016, 4 pages.
Internal DNS Security, Infoblox Control Your Network, Infoblox Inc., Nov. 2015, 4 pages.
Passive DNS Analytic Use Cases in Threatstream, Retrieved from the internet: https://www.threatstream.com/blog/passive-dns-analytic-use-cases-in-threatstream, Jan. 7, 2016, 7 pages.
Predictive Big Data Security Analytics You Can Trust, ArcSight Analytics, Retrieved from the internet: http://www8.hp.com/us/en/software-solutions/siem-big-data-security-analytics/index . . . , Jan. 7, 2016, 4 pages.
Real-time Applications Intelligence for Superior Customer Experience, Splunk Stream, Retrieved from the internet: https://www.splunk.com/en_us/products/splunk-stream.html, Jan. 7, 2016, 9 pages.
Real-Time Visibility Into Wire Data, Splunk Stream, Retrieved from the internet: http://www.splunk.com/en_us/products/splunk-app-for-stream.html, Jan. 7, 2016, 6 pages.
Splunk Enterprise Security, Product Features, Retrieved from the internet: http://www.splunk.com/en_us/products/premium-solutions/splunk-enterprise-security/features, Jan. 7, 2016, 17 pages.
Splunk for DNS, Retrieved from the internet: https://splunkbase.splunk.com/app/1090/, Jan. 7, 2016, 4 page.
Take a Good Look at Your Network, Product Overview, Thousand Eyes, Retrieved from the internet: https://www.thousandeyes.com/product/tour/overview, Jan. 7, 2016, 4 pages.
Threat Prevention, Palo Alto Networks, PAN-OS® Administrator's Guide Version 6.0, 2007-2016, 28 pages.
Tracking Malicious Activity with Passive DNS Query Monitoring, Security, Retrieved from the internet: http://blogs.cisco.com/security/tracking-malicious-activity-with-passive-dns-query-m . . . , Jan. 7, 2016, 10 pages.
Bilge, Exposure: Finding Malicious Domains Using Passive DNS Analysis, NDSS Symposium 2011, Feb. 2011, 17 pages.
"Introducing PassiveTotal (Nutmeg) and Enterprise Services Introducing PassiveTotal (Nutmeg) and Enterprise Services", Retrieved from the Internet: URL:https:jjweb-beta.archive.orgjweb/20150612194638/http:f/blog.passivetotal.orgjpassivetotal-enterprise-relaunch/[retrieved on Apr. 3, 2017], Jun. 12, 2015.
Christian, "Threat Analysis: Poison Ivy and Links to an Extended PlugX Campaign", Retrieved from the Internet: URL:https:jjweb-beta.archive.orgjweb/20150822022007/http://www.cyintanalysis.com/threat-analysis-poison-ivy-and-links-to-an-extended-plugx-campaign [retrieved on Apr. 5, 2017], Aug. 8, 2015.
Lee, "Connecting the Dots in Cyber Threat Campaigns, Part 2: Passive DNS", Retrieved from the Internet: URL:http://researchcenter.paloaltonetworks.com/2015/11/connecting-the-dots-in-cyberthreat-campaigns-part-2-passive-dns/[retrieved on Apr. 5, 2017], Nov. 4, 2015.
Application No. PCT/US2017/012107, "International Search Report and Written Opinion", dated Apr. 13, 2017, 14 pages.

* cited by examiner

| Classify | t c m b |
|---|---|
| Monitor | |

TAGS

| ⊙ makonbcmakonix_sta ⊙ active | |
|---|---|
| Add tag... | + |
| | copy |

UNIQUE (9)

| aljazeera.org | 97 |
| pravdaonline.com | 87 |
| nuclear-reactor.org | 79 |
| ausa.info | 59 |
| shurt.biz | 58 |
| ausameetings.com | 34 |
| mail.aljazeera.org | 10 |
| bbcnewsweek.com | 6 |
| www.aljazeera.org | 4 | https://www.yyyttt.org/tag/russia

▼ 1 ▲

▼ Ginty Enterprise Demo.pdf

1420

Select a date or dates (shift-click) on the Heatmap to filter results copy

| | Resolve | First | Last | Source | Tags |
|---|---|---|---|---|---|
| ☐ | shurt.biz | 2015-05-19 18:27:46 | 2015-11-03 06:46:43 | kaspersky | steve+demo@yyyttt.org |
| ☐ | pravdaonline.com | 2015-07-08 13:11:12 | 2015-11-03 06:44:18 | kaspersky | russia x |
| ☐ | nuclear-reactor.org | 2015-07-10 09:07:19 | 2015-11-03 06:41:35 | kaspersky | russia x |
| ☐ | aljazeera.org | 2015-07-08 20:19:23 | 2015-11-03 06:38:03 | kaspersky | |
| ☐ | ausa.info | 2015-07-09 18:52:13 | 2015-11-02 06:56:59 | kaspersky | |
| ☐ | shurt.biz | 2015-05-19 18:27:46 | 2015-11-02 06:56:59 | kaspersky | |
| ☐ | pravdaonline.com | 2015-07-08 13:11:12 | 2015-11-02 06:54:24 | kaspersky | russia x |
| ☐ | nuclear-reactor.org | 2015-07-10 09:07:19 | 2015-11-02 06:52:25 | kaspersky | russia x |
| ☐ | aljazeera.org | 2015-07-08 20:19:23 | 2015-11-02 06:49:00 | kaspersky | |
| ☐ | ausa.info | 2015-07-09 18:52:13 | 2015-11-02 06:36:02 | kaspersky | |
| ☐ | shurt.biz | 2015-05-19 18:27:46 | 2015-11-01 06:55:09 | kaspersky | |
| ☐ | pravdaonline.com | 2015-07-08 13:11:12 | 2015-11-01 06:52:33 | kaspersky | russia x |
| ☐ | nuclear-reactor.org | 2015-07-10 09:07:19 | 2015-11-01 06:50:38 | kaspersky | russia x |
| ☐ | aljazeera.org | 2015-07-08 20:19:23 | 2015-11-01 06:47:14 | kaspersky | |
| ☐ | ausa.info | 2015-07-09 18:52:13 | 2015-11-01 06:34:02 | kaspersky | |

| t c m b | add tag... | | | + | |

⇩ Show All   ✕

1600 → [Search for a domain, IP, email, SSL certificate hash or tag...]

ausasmeetings.com

| ATTRIBUTES | | | |
|---|---|---|---|
| First Seen | 2015-07-10 00:00:00 | | |
| Last Seen | 2015-10-22 10:14:00 | | |
| Resolutions | 153 | | |
| Primary | ausameetings.com | | |
| TLD | .com | | |
| Ever Compromised? | true / false | | |
| Dynamic DNS | true / false | | |
| Classify | t / c / m / b | | |
| Monitor | 👁 | | |

TAGS: 🏴 pawn_storm  🏴 russia  👁 watching

⚠ Malware  ⬤ active

Add tag... + https://www.yyyttt.org/tag/russia

📄 Ginty Enterprise Demo.pdf ▶

1610 → Heatmap WHOIS Potential Malware ①

| | |
|---|---|
| Date Checked | 2015-07-13 |
| WHOIS Server | whois.PublicDomainRegistry.com |
| Registrar | PDR LTD D/B/A PUBLICDOMAINREGISTRY.COM |
| Created | 2015-07-07 |
| Updated | 2015-07-07 |
| Expires | 2016-07-07 |
| Name Servers | admi180192.earth.orderbox-dns.com<br>admi180192.mars.orderbox-dns.com<br>admi180192.mercury.orderbox-dns.com<br>admi180192.venus.orderbox-dns.com |

| | |
|---|---|
| Email | contact@privacyprotect.org (registrant, admin, tech) |
| Name | Domain Admin (registrant, admin, tech) |
| Organization | Privacy Protection Service INC d/b/a PrivacyProtect.org (registrant, admin, tech) |
| Street | C/O ID#10760, PO Box 16 Note -- Visit PrivacyProtect.org to contact the domain owner/operator Note- Visit PrivacyProtect.org to contact the domain owner/operator (registrant, admin, tech) |
| City | Nobby Beach (registrant, admin, tech) |
| State | Queensland (registrant, admin, tech) |
| Postal | QLD 4218 (registrant, admin, tech) |
| Country | AUSTRALIA (registrant, admin, tech) |
| Phone | 4536946676 (registrant, admin, tech) |

*WHOIS provided by YYYTTT*

1620 → Showing : jul 10, 2015 -- jul 20, 2015  Clear

☐ Resolve  Location  Network  First  Last  Source  Tags

⇩ Show All  ✕

FIG. 16 ausasmeetings.com

| ATTRIBUTES | | Heatmap WHOIS Potential Malware ① | | | | | |
|---|---|---|---|---|---|---|---|
| First Seen | 2015-07-10 00:00:00 | Source | Sample | | | | |
| Last Seen | 2015-10-22 10:14:00 | virustotal | 0460fe1082e486c5d308eeda51fabfcf38d4eb59f68e3a23d2ca87c1048b2f4b | | | | |
| Resolutions | 153 | | | | | | |
| Primary | ausameetings.com | | | | | | |
| TLD | .com | | | | | | |
| Ever Compromised? | true false | Showing : jul 10, 2015 – jul 20, 2015     Clear | | | | | |
| Dynamic DNS | true false | ☐ Resolve | Location | Network | First | Last | Source |
| Classify | t c m b | ☐ 216.104.20.189 | LV | 216.104.16.0/20 | 2015-07-14 03:42:56 | 2015-07-21 15:23:31 | mnemonic, pingly, virustotal, kaspersky, dnsres |
| Monitor | 👁 | ☐ 95.215.45.189 | LV | 95.215.45.0/24 | 2015-07-10 21:40:10 | 2015-07-14 04:47:20 | kaspersky |
| TAGS | 🔒 pawn_storm  🇷🇺 russia  👁 watching | ☐ 216.104.20.189 | US | 216.104.16.0/20 | 2015-07-14 03:42:56 | 2015-07-14 03:42:56 | mnemonic |
| | ⚠ Malware  ● active | ☐ 95.215.45.189 | LV | 95.215.45.0/24 | 2015-07-10 03:00:00 | 2015-07-13 03:00:00 | mnemonic, pingly, virustotal, kaspersky |
| Add tag... | + | | | | | | |
| UNIQUE (4) | copy | | | | | | |

RISKIQ PassiveTotal

Tours  Blog  Contact Us

Resolutions (14) WHOIS (6) Subdomains (12) Trackers (21) Components (288) Host Pairs (139) OSINT (10) DNS (18)

▼ DATA 2200

CHANGE HISTORY

| Current Record |
|---|
| 2016-04-15 |
| 2016-04-08 |
| 2016-02-05 |
| 2016-02-03 |
| 2016-01-30 |

RECORD FROM CURRENT RECORD

Checked by RiskIQ | Expires in 4 months | Created 3 years ago

| Attribute | Value |
|---|---|
| WHOIS Server | whois.1and1.com |
| Registrar | 1 & 1 internet AG |
| Email | Privacy@1and1.com (registrant, admin, tech) |
| Name | Oneandone Private Registration (registrant, admin, tech) |
| Organization | 1&1 Internet Inc (registrant, admin, tech) |
| Street | 701 Lee Road Suite 300 ATTN (registrant, admin, tech) |
| City | Chesterbrook (registrant, admin, tech) |
| State | PA (registrant, admin, tech) |
| Postal | 19087 (registrant, admin, tech) |
| Country | US (registrant, admin, tech) |
| Phone | 18772064254 (registrant, admin, tech) |
| NameServers | ns-1460.awsdns.54.org<br>ns-218.awsdns.27.com<br>ns-613.awsdns.12.net<br>ns-1868.awsdns.41.co.uk |

| Hostname | First | Last | Type | Value | Tags | |
|---|---|---|---|---|---|---|
| blog.passivetotal.org | 2015-10-08 | 2016-12-14 | GoogleAnalyticsAccountNumber | ua-61048133 | Non Malicious | ☐ Routable |
| blog.passivetotal.org | 2015-10-08 | 2016-12-14 | GoogleAnalyticsTrackingId | ua-61048133-4 | Non Malicious | ☐ Routable |
| blog.passivetotal.org | 2016-01-10 | 2016-12-14 | TwitterId | passivetotal | Non Malicious | ☐ Routable |
| passivetotal.org | 2016-07-22 | 2016-12-14 | GoogleTagManagerId | gtm-mgnfjh | Non Malicious | ☐ Routable |
| app.passivetotal.org | 2016-08-19 | 2016-12-14 | GoogleTagManagerId | gtm-mgnfjh | Non Malicious | ☐ Routable |
| help.passivetotal.org | 2016-08-20 | 2016-12-13 | GoogleTagManagerId | gtm-mgnfjh | Non Malicious | ☐ Routable |
| help.passivetotal.org | 2016-08-23 | 2016-12-13 | GoogleAnalyticsAccountNumber | ua-57505611 | Non Malicious | ☐ Routable |
| help.passivetotal.org | 2016-08-23 | 2016-12-13 | GoogleAnalyticsTrackingId | ua-57505611-6 | Non Malicious | ☐ Routable |
| app-vip.passivetotal.org | 2016-11-14 | 2016-12-13 | GoogleAnalyticsTrackingId | ua-57505611-7 | Non Malicious | ☐ Routable |
| app-vip.passivetotal.org | 2016-08-20 | 2016-12-13 | GoogleAnalyticsAccountNumber | ua-61048133-2 | Non Malicious | ☐ Routable |
| app-vip.passivetotal.org | 2016-08-20 | 2016-12-13 | GoogleTagManagerId | gtm-mgnfjh | Non Malicious | ☐ Routable |
| blog.passivetotal.org | 2016-12-08 | 2016-12-13 | TwitterId | brian_warehime | Non Malicious | ☐ Routable |
| blog.passivetotal.org | 2016-07-24 | 2016-12-13 | FacebookId | products | Non Malicious | ☐ Routable |

| | | | | | |
|---|---|---|---|---|---|
| ≡ ⬡ RISKIQ PassiveTotal | | | Tours | Blog | Contact Us |
| ▽ DATA 2720 | 2016-06-12 to 2016-12-15 | | | | |
| FILTERS ⓘ | Resolutions (14) WHOIS (6) Subdomains (14) Trackers (21) Components (288) Host Pairs (139) OSINT (10) DNS (18) | | | | |
| RECORD TYPE (3/18) | DNS ⓘ | | | 2730 | Download Copy |
| ✓ ✗ NS 6 | Show: 25  1-18 of 18  Sort: Last Seen Descending ▽ | | | | |
| ✓ ✗ MX 5 | Value | First | Last | | Type |
| ✓ ✗ SOA 3 | ns-1868.awsdns-41.co.uk | 2015-12-19 | 2016-12-15 | | NS |
| ✓ ✗ TXT (SPF1) 3 | alt3.aspmx.l.google.com | 2016-11-15 | 2016-12-15 | | MX |
| ✓ ✗ CNAME 1 | ns-1460.awsdns-54.org | 2016-07-26 | 2016-12-15 | | NS |
| VALUE (18/18) | ns-613.awsdns-12.net | 2016-07-26 | 2016-12-15 | | NS |
| ✓ ✗ _spf.google.com 1 | ns-218.awsdns-27.com | 2016-11-15 | 2016-12-15 | | SOA |
| ✓ ✗ alt1.aspmx.l.go... 1 | aspmx.l.google.com | 2015-08-09 | 2016-12-15 | | MX |
| ✓ ✗ alt2.aspmx.l.go... 1 | spf.google.com | 2015-12-29 | 2016-12-15 | | TXT (SPF1) |
| ✓ ✗ alt3.aspmx.l.go... 1 | awsdns-hostmaster@amazon.com | 2016-11-15 | 2016-12-15 | | SOA |
| ✓ ✗ alt4.aspmx.l.go... 1 | alt1.aspmx.l.google.com | 2016-11-15 | 2016-12-15 | | MX |
| Show More... | alt2.aspmx.l.google.com | 2016-04-22 | 2016-12-15 | | MX |
| | servers.mcsv.net | 2016-11-15 | 2016-12-15 | | TXT (SPF1) |
| | alt4.aspmx.l.google.com | 2016-11-15 | 2016-12-15 | | MX |
| | www.passivetotal.org | | 2016-12-14 | | CNAME |

FIG. 27

TECHNIQUES FOR INFRASTRUCTURE ANALYSIS OF INTERNET-BASED ACTIVITY

CROSS-REFERENCES TO RELATED APPLICATIONS

The present application is a U.S. Non-Provisional patent application that claims priority and benefit from:
1) U.S. Provisional Application No. 62/274,741, filed Jan. 4, 2016, entitled "TECHNIQUES FOR INFRASTRUCTURE ANALYSIS OF INTERNET DOMAINS AND INTERNET PROTOCOL (IP) ADDRESS RESOLUTION"; and
2) U.S. Provisional Application No. 62/309,937, filed Mar. 17, 2016, entitled "TECHNIQUES FOR INFRASTRUCTURE ANALYSIS OF INTERNET DOMAINS AND INTERNET PROTOCOL (IP) ADDRESS RESOLUTION."

The entire contents of each of the above-identified patent applications are incorporated herein by reference for all purposes.

BACKGROUND

Persons (e.g., a network analyst) involved in performing infrastructure analysis of Internet-based activity may gather information from many different disparate data sources to identify network threats or changes in network infrastructure, which may relate to malicious network activity. The data sources may include provide data about domain name system (DNS) activity, WHOIS records, secure socket layer (SSL) certificates, and other page-content attributes. The data sources may be managed by different providers and may store different types of information. The information may have different formats and may vary for different time periods.

To analyze the data to identify changes in network infrastructure, an analyst may have to query many different data sources individually and gather relevant information manually. In some instances, a significant amount of time may be incurred to load each individual resource that provides data, execute a query, and receive the results of the query. Once the data has been gathered, the analyst may have to further reduce and/or aggregate the data to identify relevant data for a desired time period. The data may be formatted differently by different providers or may be unsearchable such that an analyst is burdened with the additional task for standardizing the data to a common format and identifying relevant information. Often times, analysts may have to manage additional electronic or written records based on the analysis of the data. The network data obtained from different sources may be overlapping and may have conflicts. The challenges discussed above for gathering the data restrict, if not prevent, analysts from devoting more time to the analysis of network data to identify changes in a network infrastructure.

After obtaining the data sets for analysis, an analyst may be faced with making sense of the data to determine trends in network activity over a given time period for a domain or an IP address. The analyst may attempt to identify possible network threats to a domain or an IP address. Identifying a trend in a large data set may be a difficult challenge for some. In some instances, analysts may not be able to easily identify a pattern of network activity for significant periods of time without generating additional data or visualizing the data. The format or the structure of the data may limit an analyst to identify correlations or relationships between data.

BRIEF SUMMARY

Embodiments of the present disclosure are directed to techniques for infrastructure analysis of Internet-based activity. Some embodiments solve these and other challenges individually and collectively. Specifically, embodiments of the present disclosure can enable analysts to spend more time focusing on analyzing and identifying threats to in a network infrastructure, and little time on data collection and data processing. Specifically, techniques are described for identifying network data relevant to Internet activity and providing an interactive interface for viewing an interactive analysis of the network data. The network data may be identified for assessing Internet activity with respect to one or more attributes, such as an Internet domain name or an Internet protocol (IP) address.

Network data may be gathered from one or more data sources to be managed in a central repository. Network data may include data about or related to activity on the Internet. For example, network data may include active domain name system (DNS) data that is "actively" requested or obtained for one or more Internet domain names. The active DNS data may include data obtained from monitoring by requesting data about a subset of Internet domain names and/or resolution of IP addresses. In another example, network data may include passive DNS data collected from DNS records and/or data gathered by sensors on networks. In other words, passive DNS data may be data that is gathered "passively" by monitoring activity on a network. For example, passive DNS data may be gathered when a sensor identifies requests and/or responses are transmitted on a network. The sensors may be setup to capture DNS data, such as data about DNS requests and responses occurring on those networks. Passive DNS data may be useful to determine changes in Internet-based activity, such as an Internet domain or resolution of an IP address over time.

In some embodiments, network data may be processed to remove duplicate information. Network data aggregated from multiple sources may have different formats and may correspond to different time periods. The time periods can overlap. A deconfliction process may be performed on the network data to adjust the data to a common or standardized format from different formats of the network data obtained from different sources. Deconfliction may include adjusting the data obtained from different sources so that data is aligned for a time period.

The network data can be further processed to identify a subset of the network data for multiple time intervals (e.g., days) of a timescale defining a time period (e.g., a series of months). The subset of the network data for each of the time intervals may indicate information about network activity, such as IP address resolution for an Internet domain or Internet domain resolution for an IP address. In some embodiments, information (e.g., statistical information) can be determined for enrichment of the data. The information may indicate interesting events based on the data. For example, the subset of network data for a particular day may be analyzed to determine information, such as the number of unique IP addresses that have been resolved for a domain or the number of unique domain names that have resolved to an IP address. The network data may be processed to identify the time intervals during which a new Internet domain was resolved for an IP address or vice versa. Such information may be displayed with the network data to aid in the analysis of the network data.

A graphical interface may be generated to display the network data according to a time period. The time period may be a portion or subset of the time period for which data is aggregated. The network data may be displayed for a time period based on one or more attributes related to Internet activity. For example, a graphical interface may be generated to display network data according to an attribute such as an Internet domain or an IP address. The attribute, the time period, or a combination thereof may be specified by a user based on criteria of interest. Without a visual display of information, a user can be left with data from each source in a text-based format. In some embodiments, a graphical interface may be interaction with interactive elements (e.g., elements of an interactive heat map) displaying the network data based on a timescale for a time period. Each of the interactive elements may correspond to a time period (e.g., a day) on the timescale. The interactive element for a time period on the timescale may include information in a data set of the network data corresponding to that day. For example, an interactive element may indicate a number of unique IP addresses that have been resolved for an Internet domain when a user requests a view of data for the Internet domain. In another example, an interactive element may indicate a number of unique Internet domain names that have been resolved for an IP address when a user requests a view of data for the IP address.

In some embodiments, one or more interactive elements on the graphical interface may be displayed to present a visual appearance (e.g., a color) indicative of information in the network data corresponding to the interactive element(s). The appearance may be indicative of statistics or descriptive of resolution of an IP address or a domain corresponding to the information that is displayed for the interactive element. An interactive element may be interactive to cause the graphical interface to display additional information about interesting events or occurrences related to the network data for the interactive element. For example, a user may hover over an interactive element, which may cause the graphical interface to display important information about the network data corresponding to the interactive element. Examples of the additional information may include unique IP addresses or Internet domain names resolved for the time period corresponding to the interactive element. The interactive elements and the visual appearance of those interactive elements provide an analyst with visual cues and other ways of managing research on network data.

The graphical interface may be interactive to enable a user to perform intelligent filtering and display of the network data underlying the interactive elements displayed on the interface. The time period of the network data shown in the graphical interface may be adjustable. In some embodiments, a graphical interface may be displayed with one or more interactive elements that are interactive to select a time period for viewing network data. Adjusting the time period may cause the graphical interface to change the network data displayed according to the adjusted time period. A user can interact with the graphical interface to click on an interactive element for a particular time period (e.g., a particular day) or selectively choose multiple interactive elements corresponding to time intervals (e.g., multiple days) on the timescale. The graphical interface may be updated to display the underlying network data corresponding to the selection of the interactive elements.

Some embodiments may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, machine-readable tangible storage media, modules, or a combination thereof to perform methods and operations disclosed herein.

In at least one embodiment, a method may include accessing network data from one or more data sources, wherein the network data includes Domain Name System (DNS) data. The method may include determining, based on the network data, a portion of the network data having an attribute during a first time period. The method may include generating a plurality of data sets based on the portion of the network data having the attribute during the time period, where each of the plurality of data sets corresponds to a different one of a plurality of time intervals within the first time period. The method may include computing information about network activity for each data set in a group of data sets that are included in the plurality of data sets. The information about the network activity may be computed for a set of time intervals in the plurality of time intervals. Each data set in the group of data sets may correspond to a different time interval in the set of time intervals. The method may include generating a graphical interface that displays the information computed for each data set in the group of data sets. The information may be displayed according to a second time period defined by the set of time intervals. The graphical interface may include a plurality of interactive elements. Each interactive element of the plurality of interactive elements may display an indication based on the information about the network activity computed for a different data set in the group of data sets. The method may include causing the graphical interface to display at a device. The method may include receiving an input of an interaction with a first interactive element of the plurality of interactive elements. The method may include, based on the input, obtaining, from a first data set in the group of data sets corresponding to the first interactive element, first information in the information about the network activity computed for the first data set corresponding to a first time interval of the plurality of time intervals. The method may include updating the graphical interface to display the first information near the first interactive element.

In some embodiments, the DNS data includes passive DNS data, active DNS data, or a combination thereof. The network data may include secure sockets layer (SSL) data and domain registration data. In some embodiments, determining the portion of the network data includes identifying the DNS data having the attribute in the network data.

In at least one embodiment, the second time period is a subset of the first time period. Each of the plurality of time intervals may correspond to a different data set within the plurality of data sets for the first time period. The second time period may be within the first time period. The second time period may be configurable by a user.

In at least one embodiment, one or more of the plurality of interactive elements are displayed in the graphical interface as having one or more visual representations to provide the indication based on the information computed for each data set in the group of data sets corresponding to one or more interactive elements. The first interactive element may be displayed having an indication about a measure of occurrences of an event based on the network activity determined from the first information. In some embodiments, the first information indicates a first occurrence of an event based on the network activity determined from the information for the first interactive element.

In some embodiments, the method may include adjusting the network data to a format for the first time period based on first network data and second network data included in the network data, where the first network data has a first format, and where the second network data has a second format that is different from the first format.

In at least one embodiment, a method may include accessing network data from one or more data sources. The network data may include data related to communication using one or more Internet protocols. The method may include determining, based on the network data, a portion of the network data having an attribute during a first time period. The method may include generating a plurality of data sets based on the portion of the network data having the attribute during the time period. Each of the plurality of data sets may correspond to a different one of a plurality of time intervals within the first time period. The method may include computing information about network activity for each data set in a group of data sets that are included in the plurality of data sets. The information about the network activity may be computed for a set of time intervals in the plurality of time intervals, and wherein each data set in the group of data sets corresponds to a different time interval in the set of time intervals. The method may include generating a graphical interface that displays the information computed for each data set in the group of data sets. The information may be displayed according to a second time period defined by the set of time intervals. The graphical interface may include a plurality of interactive elements. Each interactive element of the plurality of interactive elements may display an indication based on the information about the network activity computed for a different data set in the group of data sets. The method may include causing the graphical interface to display at a device.

In some embodiments, the method may include receiving an input of an interaction with a first interactive element of the plurality of interactive elements. The method may include based on the input, obtaining, from a first data set in the group of data sets corresponding to the first interactive element, first information about the network activity computed for the first data set. The first information may be computed for a first time interval of the plurality of time intervals. The method may include updating the graphical interface to display the first information near the first interactive element.

In some embodiments, one or more of the plurality of interactive elements are displayed in the graphical interface as having one or more visual representations to provide the indication based on the information computed for each data set in the group of data sets corresponding to one or more interactive elements. A first interactive element of the plurality of interactive elements may be displayed with a first portion and a second portion. The first portion may have an appearance that indicates a measure related to an event based on the information about the network activity for the first interactive element. The second portion may be interactive to cause a portion of the information to be displayed near the first interactive element.

In some embodiments, the attribute is an Internet domain name. The information about the network activity may include a value indicating a measure of Internet Protocol (IP) addresses that have been resolved for the Internet domain name. Each data set in the group of data sets may indicate one or more IP addresses that have been resolved for the Internet domain name for a different time interval in the set of time intervals corresponding to the data set.

In some embodiments, the attribute is an Internet protocol (IP) address. The information the network activity may include a value indicating a measure of Internet domain names resolved for the IP address. Each data set in the group of data sets may indicate one or more Internet domain names that have been resolved for the IP address for a different time interval in the set of time intervals corresponding to the data set.

In some embodiments, the method may include receiving, from the device, a request to display a portion of the network data for the attribute during the second time period. Causing the graphical interface to display at the device may include sending the graphical interface to the device. The device may display the graphical interface received from the computer system.

The foregoing, together with other features and embodiments will become more apparent upon referring to the following specification, claims, and accompanying drawings.

BRIEF DESCRIPTION OF THE DRAWINGS

Illustrative embodiments of the present disclosure are described in detail below with reference to the following drawing figures:

FIGS. 4-27 illustrates graphical interfaces for a network analysis system according to some embodiments.

DETAILED DESCRIPTION

Figure 1:
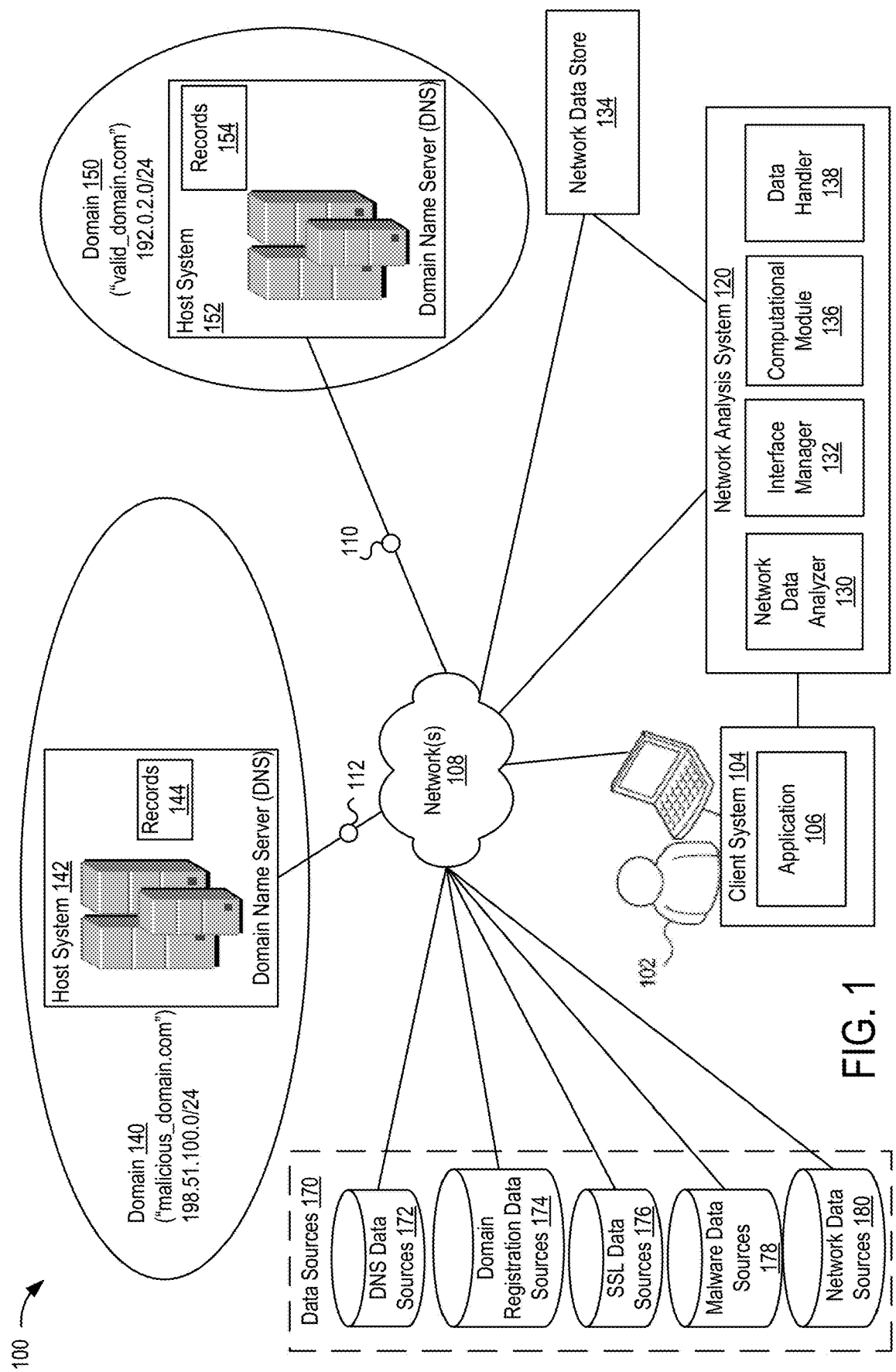
FIG. 1 shows a high-level block diagram illustrating a network analysis system according to an embodiment.

In the following description, for the purposes of explanation, specific details are set forth in order to provide a thorough understanding of embodiments of the present disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

Embodiments of the present disclosure are directed to techniques for infrastructure analysis of network data for assessment of Internet activity. The techniques disclosed herein may be implemented for any type of network data, in particular network data related to Internet-activity. The network data may be aggregated from multiple data sources, through active and/or passive techniques for data capture. Specifically, techniques are described for identifying network data relevant to one or more attributes related to Internet activity. Examples of attributes may include an Internet domain name or an Internet protocol (IP) address.

Techniques include providing an interactive interface for analysis of the network data. The interactive interface can be interactive to enable a user to obtain quick insight as to a time period and a pattern of network activity that may otherwise be difficult to ascertain for the time period.

The disclosed techniques provide many technical advantages. In a network environment producing large amounts of data related to Internet activity, a user, such as a network analyst may be faced with a daunting challenge of making sense of the data over long periods of time. The user may have to expend a significant amount of energy to identify a pattern or assess a meaning from the data collectively. For example, a network analyst may have to search through several different data sources as it relates to something like a domain or an IP address of interest to the user. In cases where there are multiple data sources that provide the same type of data, the user may have to determine a standardized format of the data for further analysis. After obtaining the data sets for analysis, an analyst may be faced with visualizing and/or assessing the data to determine trends in Internet activity over a given time period for one or more attributes. Further, without a graphical interface, a user may not be able to identify a trend or interesting network events based on aggregation and analysis of large amounts of network data. The analyst may attempt to identify possible network threats on a domain name or an IP address. The techniques disclosed herein enable a user to identify a relationship in network data that may not otherwise be identified without data visualization that enables a user to interact with the data to focus on criteria of interest. The graphical interfaces of the present disclosure may be interactive to display specific information and/or to identify statistical information indicating a relationship of Internet activity during a time period.

I. High-Level View of Network Analysis System

FIG. 1 shows a high-level block diagram of a system 100 according to an embodiment of the present disclosure. One or more of the below-described techniques may be implemented in or involve one or more computer systems. The computing environment in FIG. 1 is not intended to suggest any limitation as to scope of use or functionality of described embodiments.

System 100 may include one or more client systems 104 (referred to herein as "client system" or "client") and network analysis system 120. Network analysis system 120 may be implemented by a computing system. Client system 104 may be operated by one or more users (e.g., user 102), such as an analyst, whose role it is to assess network activity including Internet activity. Network analysis system 120 enables a user of a client to perform analysis of infrastructures of network-based digital assets. Such assets may be owned or associated with an entity (e.g., a company or network domain). Examples of network-based digital assets include, without restriction, domain names, hosts, domain name system (DNS) records, Internet protocol (IP) addresses, IP address blocks, mail servers, secure sockets layer (SSL) certificates, web servers, web pages, cookies, and particular files (e.g., advertisements, videos, etc.). The analysis may be used to determine Internet activity based on network data.

Network data may include data about hosts, data about domain names, data about DNS records (e.g., passive DNS data and active DNS data), secure socket layer (SSL) data, malware data, domain registration data (e.g., WHOIS records), data about Border Gateway Protocol (BGP), other data than can be generated based on data in this disclosure, or a combination thereof. The data about DNS records may be obtained from an implementation of a DNS system. Data about DNS records may include DNS data (e.g., passive DNS data and active DNS data). DNS data may be obtained from one or more servers implemented for a DNS. Network data may include data related to or involving protocols (e.g., communication protocols) such as an Internet protocol. Such data may include DNS data or data for a DNS. Examples of protocols may include, without limitation, Hypertext Transfer Protocol (HTTP), HTTP secure (HTTPS), file transfer protocol (FTP), file transfer protocol secure (FTPS), secure copy protocol (SCP), secure shell (SSH) file transfer protocol (SFTP), trivial FTP (TFTP), lightweight directory access protocol (LDAP), directory access protocol (DAP), dictionary network protocol (DICT), TELNET protocol, FILE protocol, Internet message access protocol (IMAP), post office protocol 3 (POP3), simple mail transfer protocol (SMTP), and rapid spanning tree protocol (RTSP). Network data may include data related to communications involving one or more network protocols. The communication may be related to accessing data over a communication network.

Client system 104 may include an interface, such as a physical interface, a graphical interface (e.g., a graphical user interface), or a combination thereof. A graphical interface may be generated by client system 104, received from network analysis system 120, or a combination thereof. The graphical interface may be updated, modified, enhanced, and regenerated, without restriction, by client system 104 and/or network analysis system 120 in response to one or more events (e.g., an interaction with the graphical interface). Examples of graphical interfaces are disclosed herein with reference to the figures. The graphical interface(s) enable functionality of network analysis system 120. A graphical interface may be provided by network analysis system 120 via network 108 as part of a service (e.g., a cloud service) or application. In some embodiments, client system 104 may provide access to one or more applications 106 ("app"). App 106 may enable a user to access and perform services provided by network analysis system 120.

Client system 104 and network analysis system 120 may be communicatively connected via one or more communication networks 108. Examples of communication networks include, without restriction, the Internet, a wide area network (WAN), a local arear network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

Network analysis system 120 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up network analysis system 120 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, network analysis system 120 may be included in or implemented in a product provided by RiskIQ, Inc. In various embodiments, network analysis system 120 may be configured to run one or more services or software applications described in the foregoing disclosure. For example, network analysis system 120 may correspond to a computing system for performing processing as described herein according to an embodiment of the present disclosure.

In some embodiments, network analysis system 120 may be implemented as an enterprise computing system or a cloud computing system comprising one or more computers and/or servers that may include those described above. Network analysis system 120 may include several subsystems and/or modules, including some, which may not be shown. For example, network analysis system 120 may include network data analyzer 130, interface manager 132, computational module 136, and data handler 138. Network analysis system 120 may have more or fewer subsystems and/or modules than shown in the figure, may combine two or more subsystems and/or modules, or may have a different configuration or arrangement of subsystems and/or modules. Subsystems and modules of network analysis system 120 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, network analysis system 120 may also provide other services or software applications can include non-virtual and virtual environments. In some embodiments, these services may be offered as web-based or cloud services or under Software as a Service (SaaS) model to the users of client system 104. The services offered by network analysis system 120 may include application services. Application services may be provided by network analysis system 120 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in network analysis system 120, which may be implemented as a cloud infrastructure system. Users can acquire the application services without the need for customers to purchase separate licenses and support. Various different SaaS services may be provided. Users operating client system 104 may in turn utilize one or more applications to interact with network analysis system 120 to utilize the services provided by subsystems and/or modules of network analysis system 120.

Network analysis system 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in network analysis system 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

System 100 may also include or be coupled to one or more data sources 170, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, system 100 may be coupled to or may include one or more data sources, such as DNS data sources 172, domain registration data sources 174 (e.g., WHOIS registration sources), SSL data sources 176, malware data sources 178, and network data sources 180 (e.g., communication records). The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data sources 170 may be accessible by network analysis system 120 using network 108.

System 100 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, system 100 may be coupled to or may include one or more data stores, such as network data store 134. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data store 134 may be accessible by network analysis system 120 using network 108.

System 100 may include one or more network domains (e.g., an Internet domain name), such as domain 140 and domain 150. Each domain may be implemented by a host system, which implements a domain name system (DNS) server for the domain. The DNS may maintain a directory of domain names and translate, or resolve them to Internet Protocol (IP) addresses. Domain 140 may include a host computing system 142. Host computing system 142 may stores records 144 to implement a DNS for domain 140. Domain 140 and domain 150 may be mapped (e.g., via. DNS) to one or more IP addresses, Domain 150 may include a host computing system 152. Host computing system 152 may store records 154 to implement a DNS for domain 150. Domain 140 may be communicatively connected to network 108 via an access network, Domain 150 may be communicatively connected to network 108 via an access network.

It should be noted that although not shown in FIG. 1, each of domain 140 and domain 150 may include one or more sub-domains. Each domain may also be a sub-domain of a larger domain. A domain may map to one or more IP addresses (e.g., via DNS), where each IP address is associated with a host (e.g., a host computing system). As used herein, a host may include general purpose computers, as well as other devices, that have an IP address.

System 100 may implement one or more techniques for network data capture. System 100 may include a data capture system 110, 112 to capture network data communicated via network 108. Data capture system may capture network data actively and/or passively. Active network data may include Active DNS data obtained from monitoring by requesting data about a subset of network assets, e.g., Internet domain names and/or resolution of IP addresses. Network data may include passive DNS data collected from DNS records and/or data gathered by sensors on networks. In other words, passive DNS data may be data that is gathered "passively" by monitoring activity on a network. The sensors may be setup to capture DNS data, such as data about DNS requests and responses occurring on those networks. Passive DNS data may be useful to determine changes to an Internet domain or resolution of an IP address over time.

Data capture system 110, 112 may be implemented by or as a part of network analysis system 120. Data capture system 110 may be implemented using hardware (e.g., network device), software, firmware, or combinations thereof. Data capture system 110, 112 may passively capture network data by monitoring data as it passes by. The network data may include requests and responses in communications for accessing domain 140 and/or domain 150. Data capture system 110, 112 may be part of or communicatively coupled to network analysis system 120. In at least one embodiment, client system 104 may include an agent ("capture agent") that can capture data communicated in system 100. The agent may be an application that resides on client system 104. The agent may be part of data capture system 110, 112. Data captured by data capture system 110, 112 and/or by the agent may be communicated to network analysis system 120 and/or directly stored in network data store 134. In some embodiments, the data captured may be stored in one or more of data sources 170. In some embodiments, data capture system 110, 112 may actively capture data by querying and retrieving data from one or more data sources 170.

Network analysis system 120 may aggregate network data using passive and/or active data aggregation techniques. Without network analysis system 120, a user such as a network analyst would have to query a myriad of different sources per data type. Network analysis system 120 reduces if not eliminates the amount of time to load each individual data source (e.g., a website), execute a query and then wait for results. Even once results have been loaded, the user would still need to aggregate them all together. For example, a user interested in aggregating data from multiple data sources 170 may have to implement several processes, including querying web interfaces available to get information from several sources, writing code to query all source APIs (assuming the source has one) to get information, use a combination of web or API queries to collect data. The user would have to communicate with host systems 142, 152 to obtain data about network activity. For example, data handler 138 may perform operations to aggregate network data.

Even once a user is able to obtain passive and active network data, a user may be faced with an entire new set of challenges as each source may use its own unique data format. Network analysis system 120 may implement a deconfliction process on the network data to adjust (e.g., normalize) the network data to a common or standardized format from different formats of the network data obtained from different sources. In some embodiments, data handler 138 may perform processing, such as normalizing network data to a format in which data sets may be determined for an attribute according to a time period. Deconfliction may include adjusting the network data obtained from different sources so that data is aligned for a time period. The network data may include network data having same or different formats and/or covering different time periods. Data handler 138 may adjust network data to a format for a desired time period. The network data may be adjusted so that network data having different formats can be in a format having particular attributes and/or covering a particular time period. In some embodiments, network data may be processed to remove duplicate information. The network data can be further processed to identify a portion or subset of the network data for multiple time intervals (e.g., days) of a timescale defining a time period (e.g., a series of months). The subset of the network data for each of the time intervals may indicate information about network activity, such as IP address resolution for an Internet domain name or Internet domain name resolution for an IP address.

The following is an example of network data produced by deconfliction. Below is an example of a first record:

```
{
    'firstSeen': '2016-01-01',
    'lastSeen': '2016-03-01',
    'resolve': '8.8.8.8',
    'value': 'www.google.com',
    'source': 'riskiq',
    'recordType': 'A',
    'resolveType': 'ip_address'
}
```

Below is an example of a second record:

```
{
    'firstSeen': '2015-08-01',
    'lastSeen': '2016-06-01',
    'resolve': '8.8.8.8',
    'value': 'www.google.com',
    'source': 'another',
    'recordType': 'A',
    'resolveType': 'ip_address'
}
```

Deconfliction would result in the following data set based on the first data set and the second data set. The resulting data set can be a combination of multiple data sets having some or all of the same attributes. The data for some attributes may be combined or not included whether the same attribute is not found in the data sets being processed.

```
{
    'firstSeen': '2015-08-01',
    'lastSeen': '2016-06-01',
    'resolve': '8.8.8.8',
    'value': 'www.google.com',
    'source': ['riskiq', 'another'],
    'recordType': 'A',
    'resolveType': 'ip_address'
}
```

Based on the aggregated data, network analysis system 120 can perform operations to store and retrieve network data corresponding to the different time intervals for a time period. Network analysis system 120 may process the network data to identify network activity that can be presented in a heat map graphical interface described below. Network analysis system 120 may use network data store 134 to store data mapping network activity for time intervals (e.g., a day) over a time period (e.g., months). Network analysis system 120 can generate one or more data structures that store information about network activity (e.g., IP address resolution for an Internet domain name or Internet domain name resolution for an IP address). The information may be stored such that unique network activity is identified for the time interval for display in a heat map interface. The network activity may be mapped or linked to one or more data records including the information for the network activity. Data handler 138 may be configured to perform operations disclosed herein as being performed for handling data, such as aggregation and generating data.

Network analysis system 120 (e.g., data handler 138) may perform operations for managing data about network activity corresponding to interesting events that are identified. The network data stored by network analysis system 120 may be searchable and associated with one or more attributes (e.g., an IP address, a time period, a domain, a source, etc.) related to the data. Data for analysis may be identified based on one or more attributes. The attribute(s) can be specified by input from a user. The attributes may be used to flag network activity interesting to a user based on criteria specified by the user in the graphical interfaces described below. In some embodiments, network analysis system 120 may identify a pattern of malicious and/or non-malicious network activity based on the stored network data. The pattern may be identified according to the network data stored for different time intervals over a time period. Patterns may be further identified based on one or more attributes specified by the user. The attributes may be used to selectively monitor network activity with respect to those attribute(s). For example, network analysis system 120 can determine unique IP address resolutions for an IP address specified by a user. Network analysis system 120 may implement operations to identify and access the network data to display in any of the graphical interfaces disclosed herein. The operations may be implemented by network analysis system 120 to support features of the present disclosure.

As further disclosed, computational module 136 may be configured to determine information about network activity based on network data. Specifically, computational module 136 may determine (e.g., compute) information (e.g., statistical information) about network activity, such as a measure of network activity (e.g., unique IP address resolutions). The information determined by computational module 136 may be used by interface manager 132 to display information about network activity based on network data. The information may be used by network data analyzer 130 to further perform data analysis to determine trends, measures, and other information about network activity.

II. Processes for Analysis of Network Activity

Figure 2:
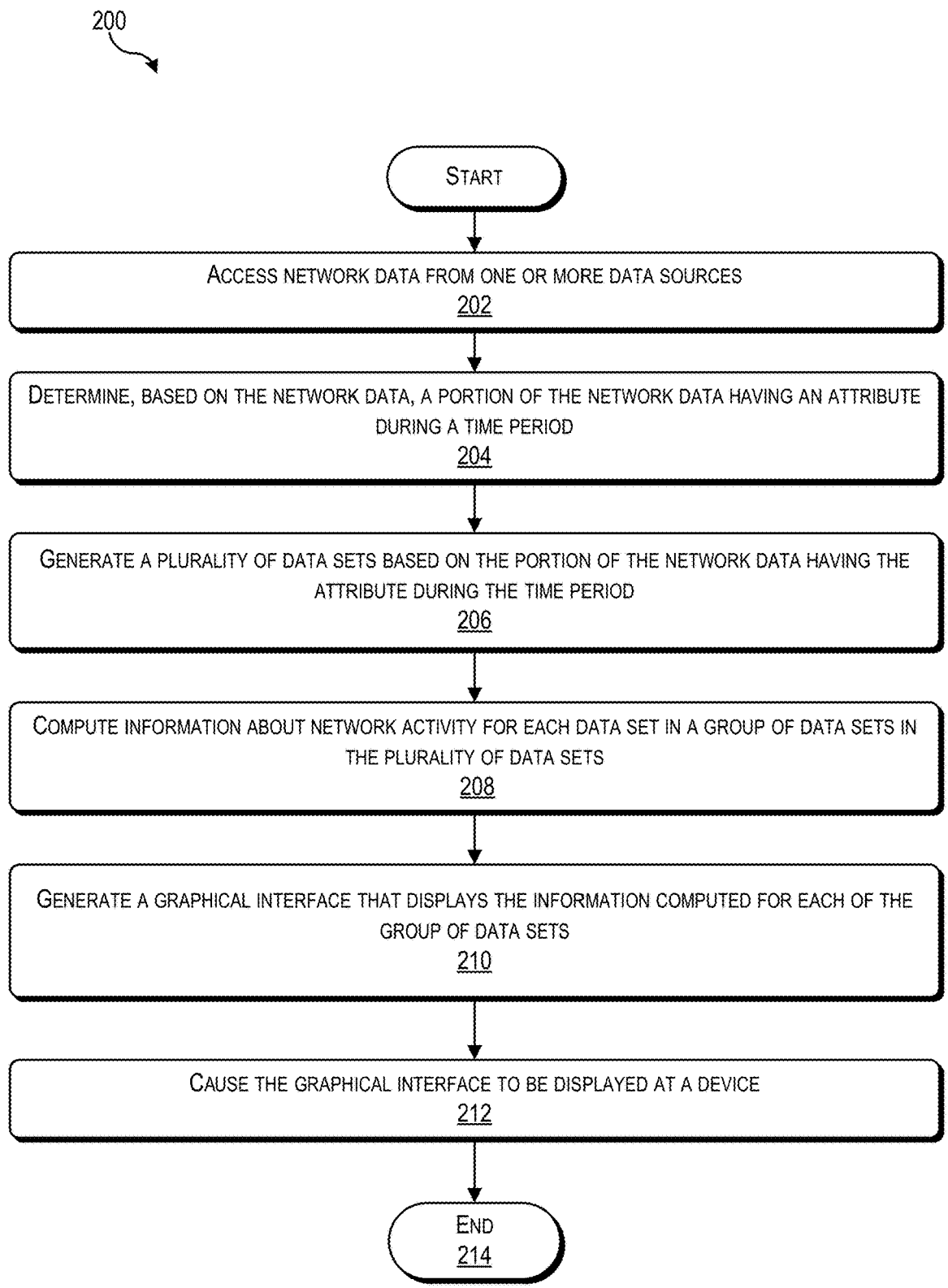
FIG. 2 illustrates a flowchart of a process of network analysis according to some embodiments.
Figure 3:
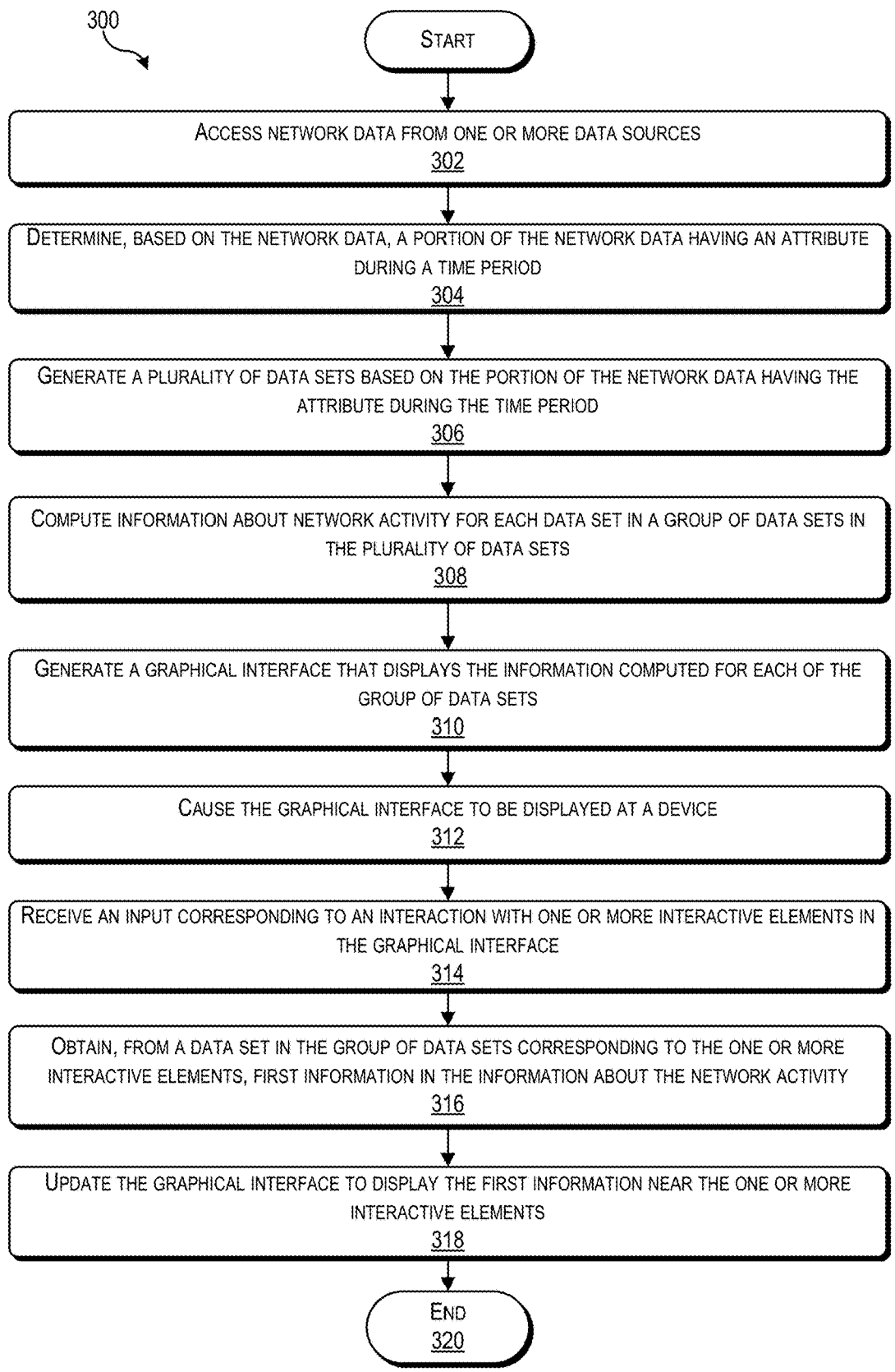
FIG. 3 illustrates a flowchart of a process of network analysis according to some embodiments.

FIGS. 2 and 3 illustrates examples of processes of network analysis according to some embodiments. These processes may be implemented by network analysis system 120 of FIG. 1. Specifically, FIGS. 2 and 3 illustrate how network data for one or more attributes can be displayed in a graphical interface that is interactive to provide a user with information about network activity related to the attribute during a time period.

Process 200 begins at step 202 by accessing network data from one or more data sources. The network data may be accessed for a time period. The network data may include Domain Name System (DNS) data for one or more Internet domain names or IP addresses. The DNS data may include active DNS data, passive DNS data, or both. Data handler 138 of FIG. 1 may perform operations disclosed with reference to step 206.

In some embodiments, the network data may be adjusted for a time period based on first network data and second network data included in the network data. The first network data may have a first format. The second network data may have a second format that is different from the first format. The network data may be adjusted by implementing a deconfliction process. The adjusting may include generating network data that is normalized, or has a format common to one or more attributes of the data.

At step 204, based on the network data, a portion of the network data having an attribute for the first time period may be determined. In some embodiments, the portion of the network data may be determined based on a request. The request may be specified as input at a device. The request may indicate one or more criteria for displaying a portion of network data. For example, the request may indicate one or more attributes specified by a user for displaying network data. Examples of attributes may include an IP address or a domain name. The request may indicate a time period during which to determine network data. The time period may be a subset or a portion of the time period for which the network data is accessed. Determining the portion of the network data for an attribute may include identifying, in the network data, the network data corresponding to an attribute. For example, determining the portion of the network data includes identifying the DNS data having the attribute in the network data. Data handler 138 of FIG. 1 may perform operations disclosed with reference to step 206.

At step 206, a plurality of data sets based on the portion of the network data having the attribute during the time period may be generated. Each of the plurality of data sets may corresponds to a different one of a plurality of time intervals within the time period. The data sets may be generated based on identifying the network data corresponding to an attribute for each of the time intervals. For example, an attribute is an Internet domain name or an IP address. Where the attribute is an Internet domain name, each data set in the group of data sets may indicate one or more IP addresses that have been resolved for the Internet domain name for a different time interval in the set of time intervals corresponding to the data set. Where the attribute is an IP address, the each data set in the group of data sets may indicate one or more Internet domain names that have been resolved for the IP address for a different time interval in the set of time intervals corresponding to the data set. Each time interval may correspond to a time period according to a scale (e.g., a day, a month, an hour, etc.). For example, each of the intervals may correspond to a 24-hour period, such as a day, in the time period. Each data set in the group of data sets may correspond to a different time interval in the set of time intervals. Network data analyzer 130 and data handler 138 of FIG. 1 may perform operations disclosed with reference to step 206.

At step 208, information about network activity may be determined for each data set in a group of data sets in the plurality of data sets. The group of data sets may include all or some of the plurality of data sets. The group of data sets may be chosen based on having a value for an attribute. The group of data sets may be chosen based on a time period to display network data. The time period may be a subset of the time period for which the portion of network data is determined. The information about the network activity may be computed for a set of time intervals in the plurality of time intervals. The set of time intervals may correspond to a time period that is different from the time period for the plurality of data sets. Each data set in the group of data sets may correspond to a different time interval in the set of time intervals. In some embodiments, input may be received providing a time period for displaying network data. The time period may be different, or a subset of the time period for which the network data is accessed. For example, as disclosed herein, the time period may be provided through a graphical interface that is interactive to receive input to specify a time period. The time period may be provided by interaction with a control (e.g., time bar) displayed with a time period. Computational module 136 may implement the operations of or related to step 208.

In some embodiments, the information may be computed as statistical information about network activity. For example, the information may include a value indicating a measure of occurrences of an event related to the network activity. The event may be unique resolutions of an Internet domain where the attribute is an IP address. The event may be a unique resolution of IP addresses where the attribute is an Internet domain. The information may be computed based on the network data in each data set. In some embodiments, the information may be computed for multiple data sets in the group. The information for multiple data sets may be used to display an indication about an event related to multiple intervals corresponding to those data sets.

At step 210, an interface (e.g., a graphical interface) may be generated that displays the information computed for each data set in the group of data sets. The information may be displayed according to a second time period defined by the set of time intervals for the group of data sets. The second time period may be a subset of the first time period. The graphical interface may be a heat map. For example, the graphical interface may include a plurality of interactive elements, such as interactive tiles. Each interactive element may show network data in the data set corresponding to the interactive element for a time interval. Although shown in a particular visual representation, the interactive elements may be shown according to one or more criteria, without limitation to embodiments illustrated in this disclosure. The interactive elements may be shown based on the corresponding data sets that satisfy one or more attributes. In one example, the group of data sets may be shown in the graphical interface based on an attribute of an Internet domain. As such, the information computed for the data sets may be displayed in clusters or groupings according to the criteria based on which the data sets are displayed. For example, the data sets and/or the information computed for each data set may be shown based on geography corresponding to an attribute based on which a geographic location can be determined. An interactive element may not be displayed for each data set, and instead can be displayed for multiple data sets with regard to information common or related to the data sets. In at least one embodiment, one or more of the plurality of interactive elements are displayed in the graphical interface as having one or more visual representations to provide the indication based on the information computed for each data set in the group of data sets corresponding to one or more interactive elements. In one example, a first interactive element of the plurality of interactive elements is displayed with a first portion and a second portion. The first portion may have an appearance that indicates a measure related to an event based on the information about the network activity for the first interactive element. The second portion may be interactive to cause a portion of the information to be displayed near the first interactive element. For example, the second portion may be interactive such that the information is displayed a fly-over or pop-up display of the information.

In at least one embodiment, each interactive element of the plurality of interactive elements corresponding to the group of data sets may be displayed providing an indication based on the information about the network activity computed for the data set corresponding to the interactive element. For example, an interactive element is displayed having an indication about a measure of occurrences of an event based on the network activity determined from the first information computed for the data set corresponding to the interactive element.

In at least one embodiment, each of the plurality of interactive elements are displayed in the graphical interface as having one of a plurality of colors, the color based on the statistical information for a data set corresponding to the interactive element. In at least one embodiment, an interactive element of the plurality of interactive elements is displayed with multiple colors, a first color based on the statistical information and a second color indicating a first occurrence of an event based on activity identified for an attribute in the data set corresponding to the interactive element.

At step 212, the generated graphical interface may be displayed. Network analysis system 120 may generate the graphical interface and cause the graphical interface to be displayed at a device, e.g., a client. The graphical interface may be sent to the device, which displays the graphical interface.

Process 200 may end at step 214.

Process 300 may be implemented similar to all or part of process 200. Process 300 may begin at step 302. At step 302, network data may be accessed from one or more data sources. At step 304, a portion of the network data having an attribute during a time period may be determined based on the network data.

In some embodiments, a request may be received providing criteria for displaying network data. The criteria may include a time period and/or one or more attributes for displaying the network data. In some embodiments, a graphical interface may be generated and then displayed at a device. The graphical interface may receive input of one or more interactions. The graphical interface may display one or more interactive elements to receive input defining criteria for displaying network data. For example, the graphical interface may display a time period for which the network data is accessed. The graphical interface may provide one or more interactive elements to configure a time period for displaying all or some or the network data. In some embodiments, it may be desirable to view network data for a time period that is less than the time period for which data is accessed. The time period may be ideal for displaying information in the graphical interface. The interactive element(s) may receive input corresponding to interaction with the element(s). For example, the interactive element(s) may be a time bar that is adjustable to select a time period within a larger time period for which data is accessed. The input may correspond to coordinates on the graphical interface. The coordinates may translate to a particular time period on a scale.

At step 306, a plurality of data sets are generated based on the portion of the network data having the attribute during the time period. The data sets may be generated in a manner similar to step 206. At step 308, information about network activity for each data set in a group of data sets in the plurality of data sets is computed. The information may be computed for each data set in the group corresponding to a different time interval of the time intervals corresponding to the data set.

At step 310, a graphical interface is generated. The graphical interface may be generated to display information computed for each data set in the group of data sets. The information for any data set may be displayed by one or more elements corresponding to the data set. The information may be displayed by the interactive element(s) and/or based on interaction with the interactive element(s). In some embodiments, the information may be displayed by an indication that is based on the information. The indication may be presented as a visual or audio appearance. The indication may correspond to or based on an assessment of the information. At step 312, the graphical interface is displayed. The graphical interface may be displayed by sending the graphical interface to a client, which displays the graphical interface.

At step 314, an input may be received corresponding to an interaction with an interactive element. The input may correspond to a value that indicates the interaction or that can be used to determine the nature of the interaction. At step 316, based on the input, information is obtained from the information about the network activity corresponding to the data set for which the interaction occurred. At step 318, the graphical interface may be updated based on the information. In one example, the interactive element for which interaction occurred at step 314 may be updated to indicate the information. In another example, the graphical interface may be updated to display the information near (e.g., a fly-over or tooltip) the interactive element with which the interaction occurred for step 314. As such, the interaction with interactive elements enables a user, such as an analyst, to understand the data and statistical information based on a data set. The user can detect trends and patterns in network activity by viewing the information and associated data displayed over a time period.

III. Interactive Graphical Interfaces of a Network Analysis System

Figure 15:
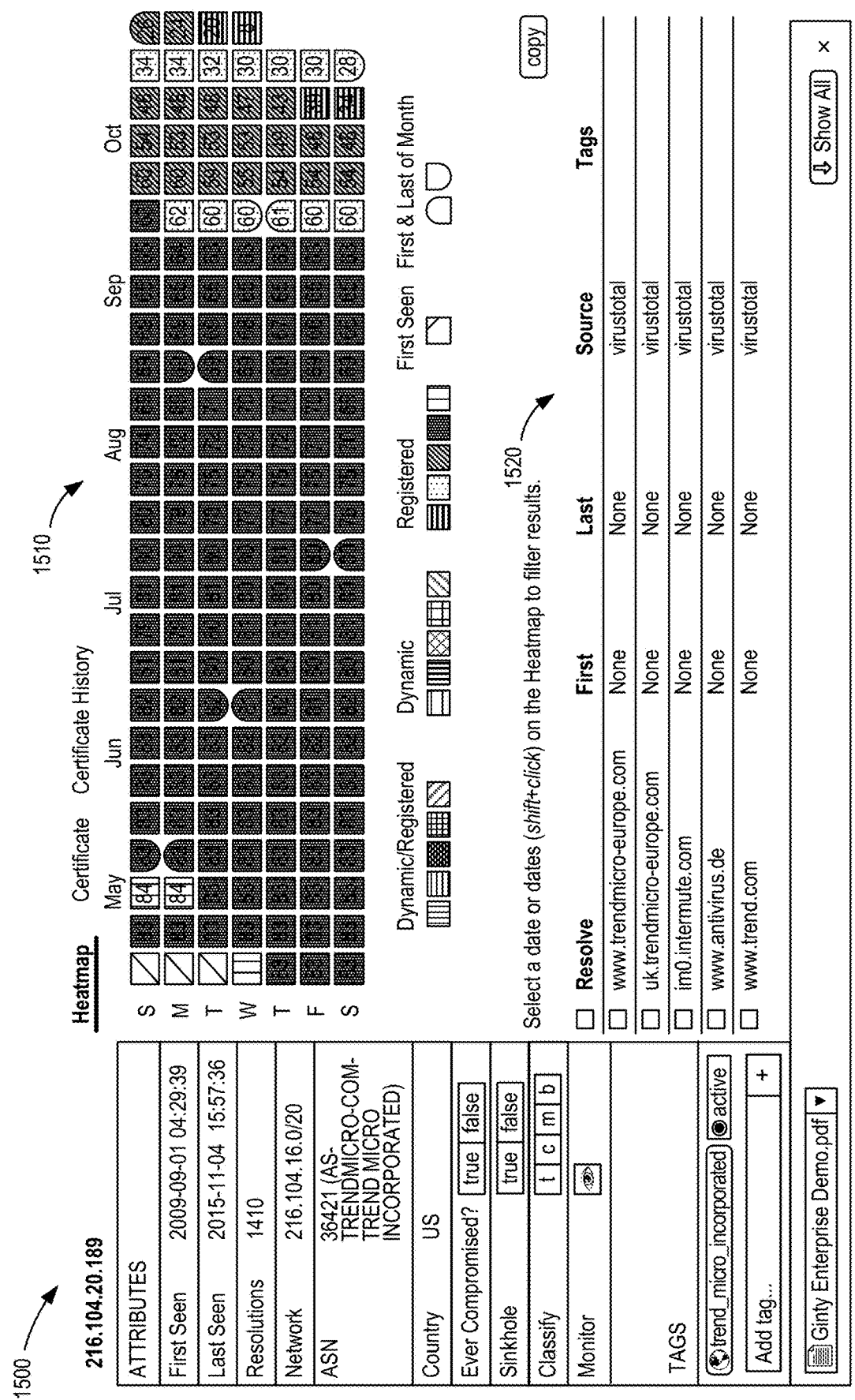

Illustrative embodiments of the present disclosure are described in detail below with reference to FIGS. 4-27. FIGS. 4-27 illustrate examples of graphical interfaces in accordance with some embodiments. The examples shown with respect to FIGS. 4-11 illustrate various graphical interfaces that present information about network activity related to IP address resolution for a domain (e.g., "ausameetings.com"). FIGS. 13-15 illustrate examples of graphical interfaces that present information about network activity related to domain resolution for an IP address (e.g., IP address 216.104.20.189). FIGS. 16-18 illustrate examples of graphical interfaces that present information about domain names and/or IP address resolution. FIGS. 19-27 illustrate some embodiments of graphical interfaces that enable a user to utilize a "discover" feature to select a type of view of network data. FIG. 20 illustrates a graphical interface that can receive input via an interactive element (e.g., a time scroll bar) to specify a time period for displaying network data in a graphical interface (e.g., "HEATMAP"). FIGS. 21-27 illustrate various graphical interfaces to selectively display different types of network data corresponding to a view of network activity in a graphical interface (e.g., "HEATMAP") that displays interactive elements for data sets according to a time scale. The techniques described with reference to any of the examples may be implemented for each of the other examples, regardless of the type of network activity, such as domain resolution or IP address resolution.

The graphical interfaces illustrated in FIGS. 4-18 and 20 provide some examples of interactive heat maps that can be provided by a network analysis system (e.g., network analysis system 120) according to some embodiments. A graphical interface may be generated based on network data obtained by the network analysis system. The graphical interface may display information about network data based on one or more criteria provided by a user via the graphical interface. The graphical interface may be modified to display additional information or one or more additional graphical interfaces such as those described with reference to the following figures. In response to interaction with a graphical interface as disclosed herein, a network analysis system can perform processing to produce the information for an updated or new graphical interface and can produce the updated/new graphical interface.

In this disclosure, "an element" may be included in a graphical interface. An element may be displayable and/or part of a graphical interface. Examples of elements include, without limitation, a control, a button, a navigation bar, or other visible component that can be part of an interface that can be perceived by sound, vision, touch, or combinations thereof. An element can receive input. For example, an interactive element may be an element that is interactive to receive input. An interactive element may receive input to enable interaction with the graphical interface. For example, an interactive element can be one of many in a graphical interface such as a heat map for which network data is displayed.

a. "Heat Map" Interface

Figure 4:
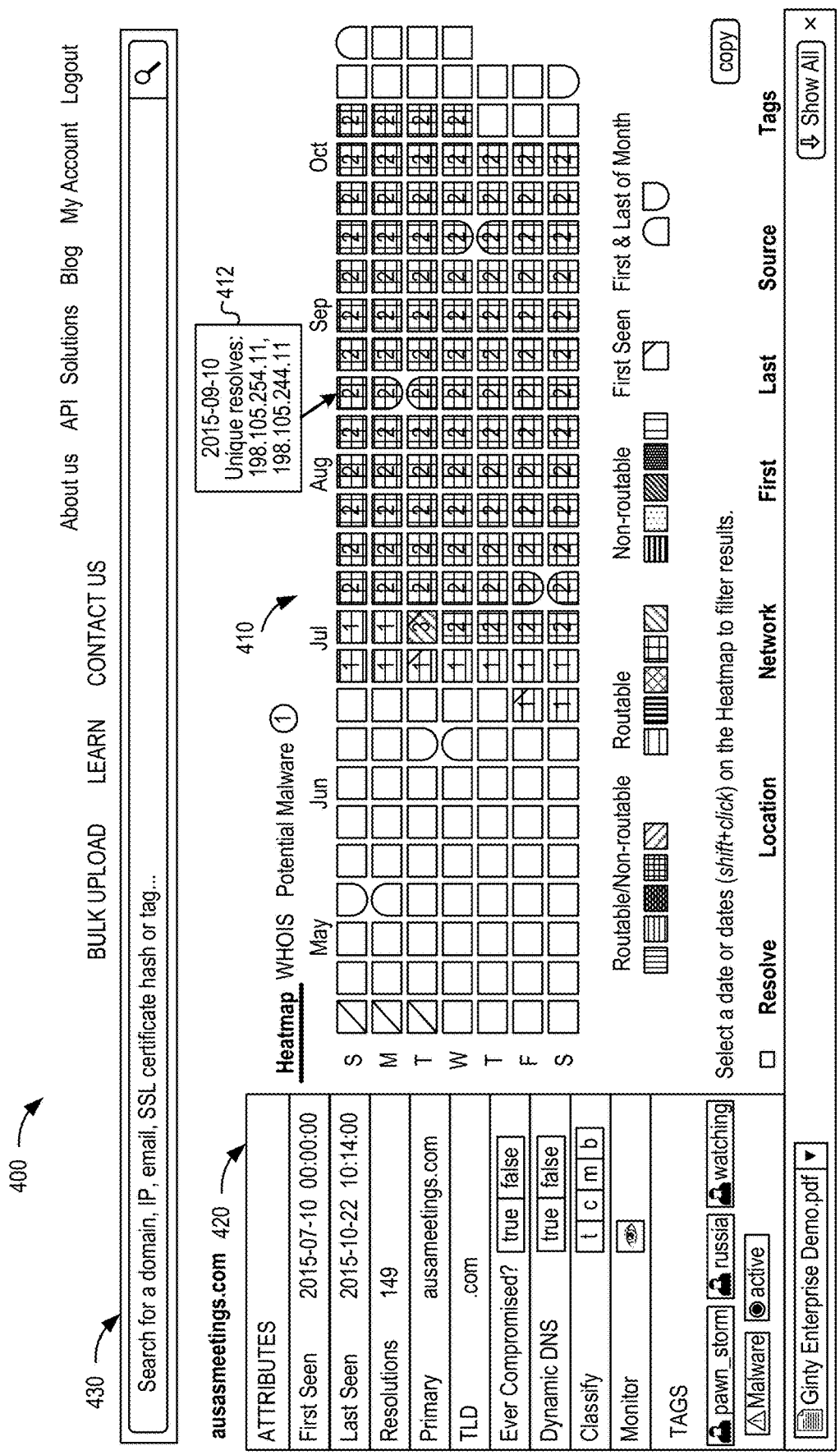

Now turning to FIG. 4, a graphical interface 400 is shown that is interactive enabling network analysis. Graphical Interface 400 includes a graphical interface 410 ("heat map") displaying network data for a time period. Graphical interface 400 can include a menu interface 420 ("Summary View") of attributes related to the network data corresponding to the interactive elements. Graphical interface 400 includes a search interface 430 that is interactive to receive input to search network data obtained by network analysis system 120. A user can provide the input that specifies a type of network data, a time period for identifying network data, one or more attributes of network activity, other information to define network data, or combinations thereof.

Search interface 430 may be interactive to receive input indicating one or more criteria for specifying the network data to view in graphical interface 410. The criteria may include a type of network data (e.g., a domain name, an IP address, an email address, or SSL certificate information). The criteria may indicate a time period (e.g., a range of months or a specific start date and end date) for which to display the network data. The criteria may include any attribute (e.g., an attribute of network data) that can be used to identify a subset of network data. In some embodiments, the criteria include an interval (e.g., hourly, daily, or weekly) for which to display network data within the time period. Based on the input to search interface 430, network analysis system 120 can obtain and generate one or more graphical interfaces within information based on network data corresponding to the search criteria.

In the example shown in FIG. 4, graphical interface 410 shows network data about an Internet domain name ("ausameetings.com") for a time period starting in May and ending in October. Graphical interface 410 illustrates an example of IP address resolved for the Internet domain name during the time period. Information in network data may be displayed by one or more tiles of graphical interface 410. A tile is shown as a square in graphical interface 410. One or more tiles may correspond to an interactive element. In the example shown in FIG. 4, graphical interface 410 includes interactive elements, each of which corresponds to a tile in graphical interface 410.

Based on criteria provided by a user (e.g., criteria input via search interface 430), network analysis system 120 can determine a subset of the network data for the Internet domain name within the time period. Network analysis system 120 can search and retrieve the subset of network data (e.g., network data 170) based on identifying the subset matching the criteria (e.g., the Internet domain name and the time period). As explained above, network analysis system 120 can produce a plurality of data sets based on the network data. A data set in the plurality of data sets may indicate information about multiple network events. The plurality of data sets may be produced according to the criteria specified by the user. For example, the network data, once obtained for the time period, is processed to produce a plurality of data sets for the Internet domain name during the time period. Each of the plurality of DNS data sets may correspond to a different one of a plurality of time intervals within the time period. Each of the time intervals may be identical based on a time interval specified by as criteria by the user.

Graphical interface 410 may be generated based on the plurality of data sets. Each of the tiles in graphical interface 410 may display information based on a different one of the plurality of data sets. In at least one embodiment, each of the tiles is an interactive element to control display of additional information about the network data in the data set corresponding to the interactive element. The additional information may be based on the underlying information of the data set. As will be explained later, a graphical interface (e.g., graphical interface 400) may be modified or regenerated to include an additional interface that displays the network data (e.g., data records) corresponding to the data set for an interactive element upon interaction with the interactive element. Graphical interface 410 may be generated to show data that can be seen, and if not may be dynamically modified to display data according to interaction with graphical interface 410.

Each interactive element corresponding to a tile in graphical interface 410 may display information about network activity for the data set corresponding to the interactive element. The information may be displayed in response to interaction with the interactive elements. The information may indicate information defining the scope of the network activity, such as a date or time range for an interval corresponding to a data set. For example, graphical interface 410 may be modified to displays information (e.g., a date) about important network activity occurring in the network data for a tile for which interaction occurs. The information may be displayed as an element or a graphical interface 412. The information may display network activity for the time interval corresponding to the network data. The information may indicate one or more unique IP addresses resolved for a domain name. If the graphical interface 410 is for an IP address, then the information may indicate one or more unique domain name that have resolved for the IP address. The information displayed by graphical interface 412 can include any information determined from network data for the tile.

Menu interface 420 may present a summary of information about attributes overall in the network data corresponding to the tiles displayed in heat map interface 410. Menu interface 420 may include one or more interactive elements to selectively control display (e.g., filter) of the network data viewed in heat map interface 410. The interactive element(s) may control a time period, resolutions, IP address, domain, top-level domain, and other analytical measures that can be used to filter the network data based on which information is displayed in graphical interface 410. Menu interface 420 may display information related to one or more attributes of data in the interface 410. For example, menu interface 420 may display information related to the interactive element(s) that are interacted with (e.g., selected or mouse-over). The information may include customer settings (e.g., tags or classifications) related to the network data.

As explained above, network analysis system 120 can generate statistical information about network activity based on network data in one or more network data sets. The statistical information may indicate network activity such as a total number of resolutions (e.g., domain resolutions for an IP address or IP address resolutions for a domain name), a total number of different domain name resolutions, a total number of different IP address resolutions, information defining a time interval (e.g., a date or time range), or other information about network activity that can be determined based on network data. The statistical information may be displayed in a tile and the statistical information may be based on the network data for the tile. Graphical interface 410 can display statistical information computed for each of the plurality of DNS data sets corresponding to a tile. The statistical information may be displayed according to a timescale defined by a plurality of time intervals. Each interactive element of the plurality of interactive elements can correspond to a different one of the plurality of DNS data sets and can indicate the statistical information computed for the different one of the plurality of DNS data sets. In some embodiments, the appearance of a tile as indicated by its profile may be modified based on the statistical information, such that the appearance conveys a meaning of the statistical information.

b. Display of Data Records for Heat Map Interface

Figure 5:
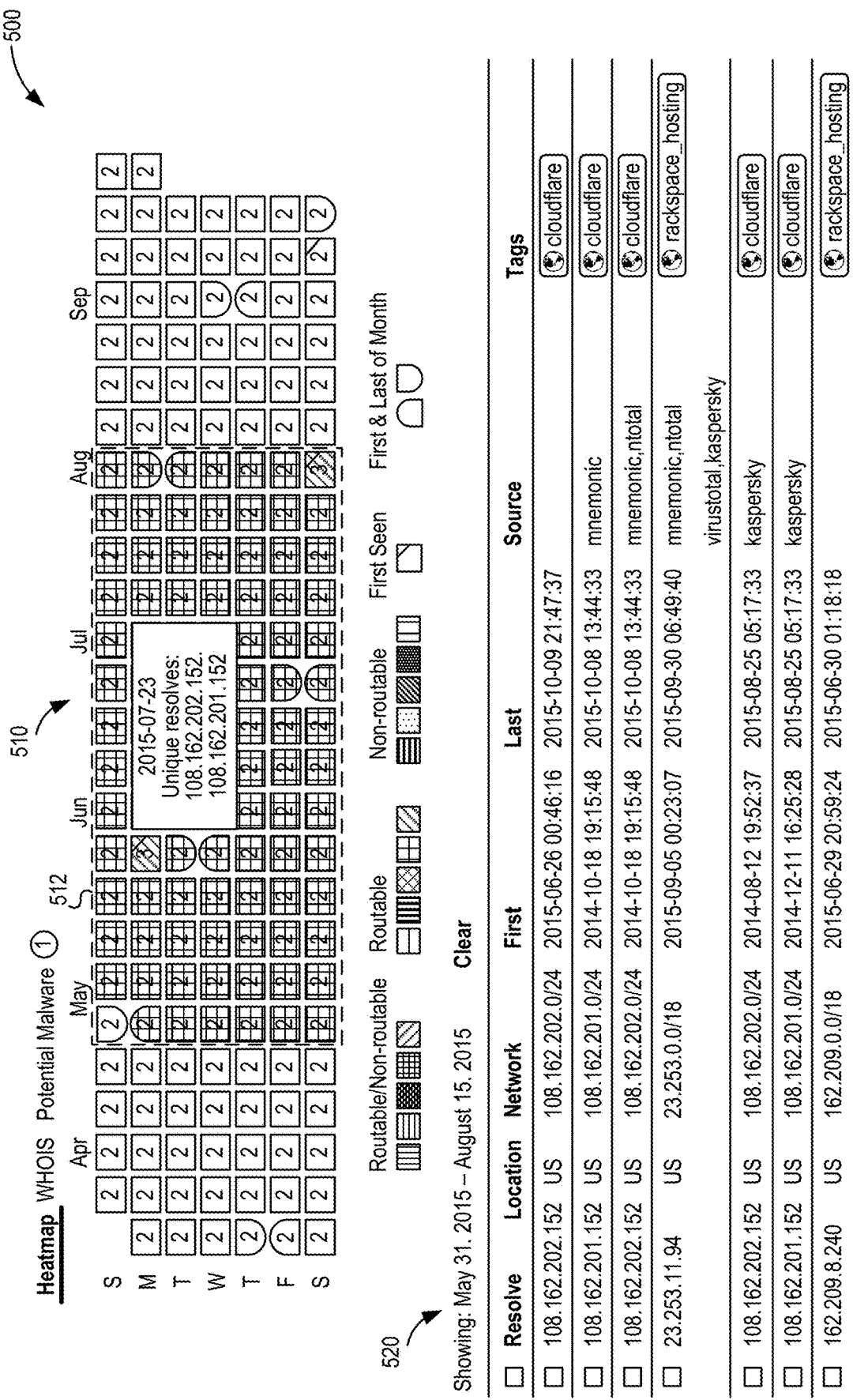

FIG. 5 illustrates an example of a graphical interface 500 for displaying network data. Similar to FIG. 4, graphical interface 500 can include the elements such as those described with reference to graphical interface 400. Network data may be displayed in a graphical interface 510 including tiles, each represented by an interactive element displaying different data set of a plurality of data sets based on network data, where each data set corresponds to a different time interval. In the example of FIG. 5, each interactive element corresponds to a data set of network data for a time interval of a calendar day. Graphical interface 510 may display network data in a manner as described for graphical interface 410 of FIG. 4.

A tile in a heat map, such as graphical interface 510, may be interactive to cause graphical interface 500 to be updated or modified to display one or more data records of the network data for the data set corresponding to the tile. In at least one embodiment, interaction with a tile (e.g., selection or of a tile) may cause graphical interface 500 to be modified so that it includes a graphical interface 520 ("data record interface"). For example, network analysis system 120 may receive input for the interaction. Based on the input, network analysis system 120 may generate a new graphical interface or modify graphical interface 500, either of which include data record interface 520.

Data record interface 520 may display information about each of the data records in the network data corresponding to the tile with which the interaction occurs. The data record(s) may include the information which is displayed in the tile or in an interface about the network data corresponding to the tile. Information from or about each of the data records may be displayed. The information may be displayed from each data record. The information may indicate one or more attributes for each IP address indicated by the data record as being resolved for a domain. The one or more attributes may indicate a location of the resolved IP address, a network address for resolving the IP address, a first time the IP address was resolved, a last time the IP address was resolved, a source of the IP address that is resolved, and one or more tags associated with the resolved IP address. The tag(s) may be user-defined with respect to a particular IP address.

The information displayed in data record interface 520 may include all or some of the data records in the network data corresponding to the tile. In some embodiments, data record interface 520 may display a subset of all the data records in the network data. A data record may include information about one or more IP addresses that have been resolved for a domain name, or one or more domain names for which have been resolved for an IP address. In one example, each data record in the subset may be a distinct or unique data record in all of the data records based on which the information is displayed in the tile or in an interface. In other words, a distinct record may include information that is different from all of the other data records. In another example, the data records in the subset may each be distinct with regard to a specific network event that has been identified based on the information in all the data records. In some embodiments, data record interface 520 may display information for multiple records, where each record includes information about a single IP address that has been resolved for a domain name or each record may include information about a single domain name which has resolved for an IP address. For example, one row shown in data record interface 520 may include information from multiple data records that share an attribute or relate to a network activity for an IP address or a domain name. Data record interface 520 may be interactive to adjust (e.g., scroll) the view to display additional and/or different data records.

In some embodiments, graphical interface 500 may include one or more interactive elements to selectively filter the data records for which information is displayed in data record interface 520. For example, graphical interface 500 may be interactive to enable a user to specify a time period and/or one or more attributes (e.g., IP address, location, network, first time IP address resolved, last time IP address resolve, a source, or tags) for selectively filtering the data records for which information is displayed in data record interface 520. Data record interface 520 may be interactive to filter records based on one or more columns or attributes.

In another example, graphical interface 510 may be interactive to specify a time period for network activity by interacting with one or more controls, such as shift-click and selecting one or more interactive tiles. Multiple tiles may be selected such that the information displayed in data record interface 520 will be for data records for which information is displayed in the selected tiles. Multiple consecutive or non-consecutive tiles may be selected. Data record interface 520 may display information indicating the criteria (e.g., the time period and/or one or more attributes) for which information is displayed in data record interface 520. In the example shown in FIG. 5, data record interface 520 is shown with information obtained from multiple data records for a time period (e.g., May 31, 2015-Aug. 15, 2015). In the example, the time period for the data records may be chosen by selecting multiple tiles in graphical interface 510 corresponding to the time period. Based on selection of the tiles, the information from the data records may be obtained and displayed in data record interface 520 for different IP address resolutions for a domain name previously selected for the graphical interface 510.

c. Display of Unique IP Resolutions in Heat Map Interface

Figure 6:
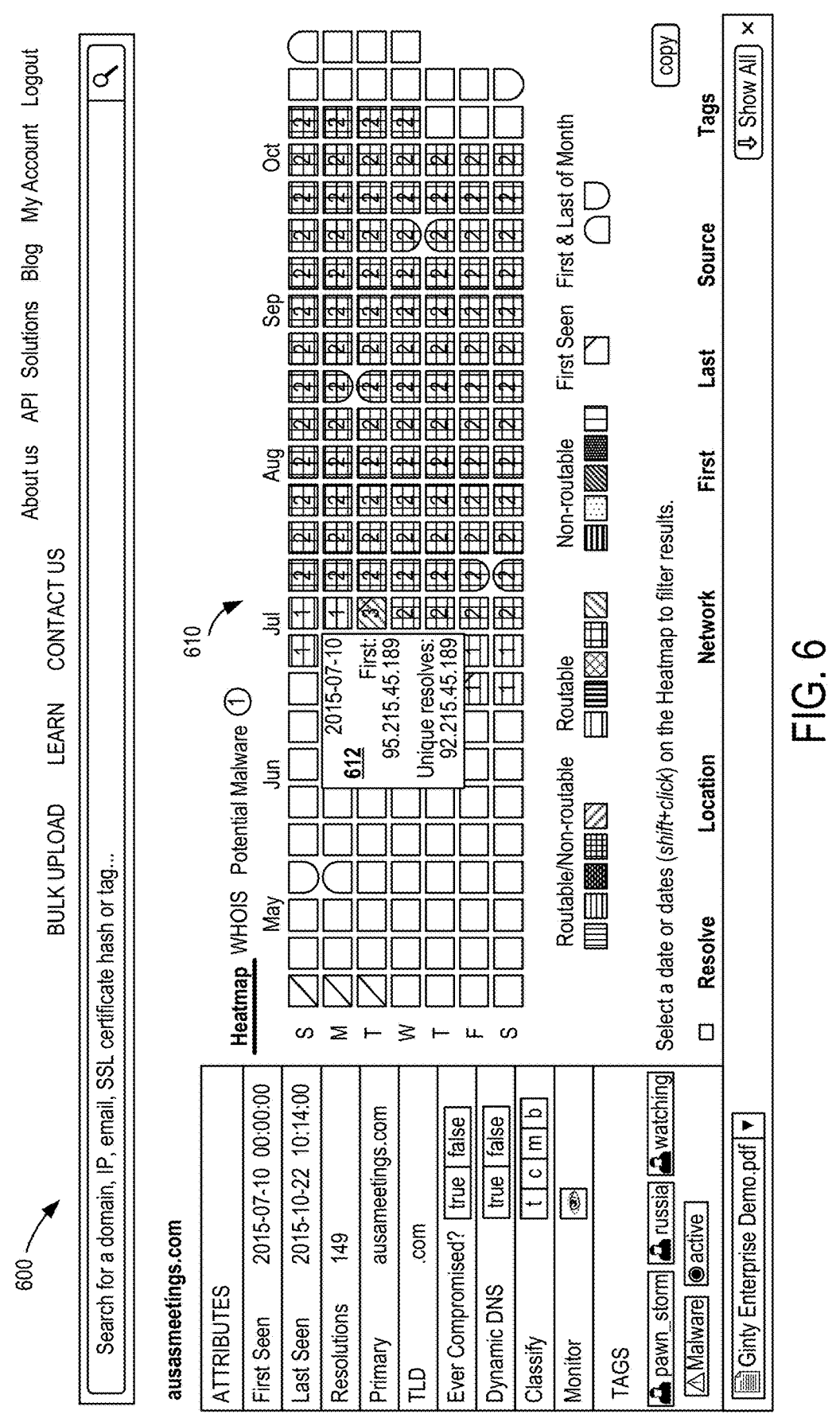

FIG. 6 illustrates another example of a graphical interface 600 displaying network data. Similar to FIG. 4, graphical interface 600 can include the elements of graphical interface 400. Network data may be displayed in a graphical interface 610 including tiles, each represented by an interactive element displaying different data set of a plurality of data sets based on network data, where each data set corresponds to a different time interval. In the example of FIG. 6, each interactive element corresponds to a data set of network data for a time interval of a calendar day. Graphical interface 610 may display network data in a manner as described for graphical interface 410 of FIG. 4.

Graphical interface 610 may be useful to identify a trend in network activity, in particular IP address resolution over a time period shown by graphical interface 610. For example, graphical interface 610 illustrates that for a time period in May, June, part of July and at the end of October, network IP address resolution was non-existent for domain name "ausameetings.com." Each of the tiles displayed in graphical interface 610 are shown as having little or no routable activity with respect to network IP address resolution for that domain name. In the same example, graphical interface 610 shows that for a time period beginning in July and continuing into October, each of the tiles indicates routable activity with regard to a network IP address resolution for "ausameetings.com." For example, each of the tiles indicating routable activity are shaded varying amounts based on a degree (e.g., the amount) at which network activity occurred. The shading may be defined to indicate a particular amount and/or type of network activity. The amount and/or type of network activity is based on each network event (e.g., IP address resolution) identified in the network data corresponding to the day of the tile. The presentation of the tiles may enable a user (e.g., a network analyst) to quickly and efficiently determine network activity for a time period with respect to a particular Internet domain name. The network activity may be useful in determining malicious activity with respect to the domain name, in particular IP addresses that are being resolved to the domain name.

In some embodiments, a tile may be displayed to indicate statistical information computed based information about network activity identified based on network data corresponding to the tile. For example, statistical information may indicate a number of different IP addresses that have been resolved for a domain name, e.g., "ausameetings.com." The statistical information may enable a user to instantly assess malicious behavior with respect to an Internet domain name if the amount of different IP address resolutions increases. The statistical information may prompt a user for further inquiry into the day or a time period shown in graphical interface 510.

In one example shown in FIG. 6, graphical interface 610 enables a user to further determine information underlying the network data corresponding to a tile. For example, a user may interact with a tile to cause graphical interface 610 to be modified with additional information. Graphical interface 610 may be modified such that it displays another graphical interface or element, such as element 612, displaying the additional information. A user can select or hover over a tile using a pointer control. For example, interaction with the first tile in July that has routable activity, element 612 may be displayed showing information about network activity on the day (e.g., 2015-07-10). The information may include details about network activity on the day, such as the first IP address resolved for the domain name, each of the different IP addresses that were resolved, or any other information about network activity on the day. The information displayed in 612 may be determined based on the network data corresponding to the tile with which interaction occurs. The information can enable a user to identify malicious IP addresses or other network information related to the domain name. For example, element 612 may display information indicating a single IP address that resolved several times. The user knowing that the IP address is malicious, could instantly determine that the IP address was being used to malicious route traffic for a domain name. Additionally, a user could select the tile to see detailed data records in a data record interface to further assess the nature of the network activity.

In some embodiments, a tile can be generated to have an appearance of one or more attributes that further indicate information about network activity for network data corresponding to the tile. A tile can be displayed with different colors and/or indicators (e.g., a diagonal line in a corner) that have different meaning about the network activity. For example, the tile corresponding to element 612 may be displayed with a diagonal line in the corner of the tile to indicate a first occurrence of an event (e.g., a first seen IP address for resolution). The appearance provides further instant indication about network activity. Graphical interface 510 may be configured such that the information and/or appearance of tiles can be adjusted based on particular attributes of network activity useful to a user.

Figure 7:
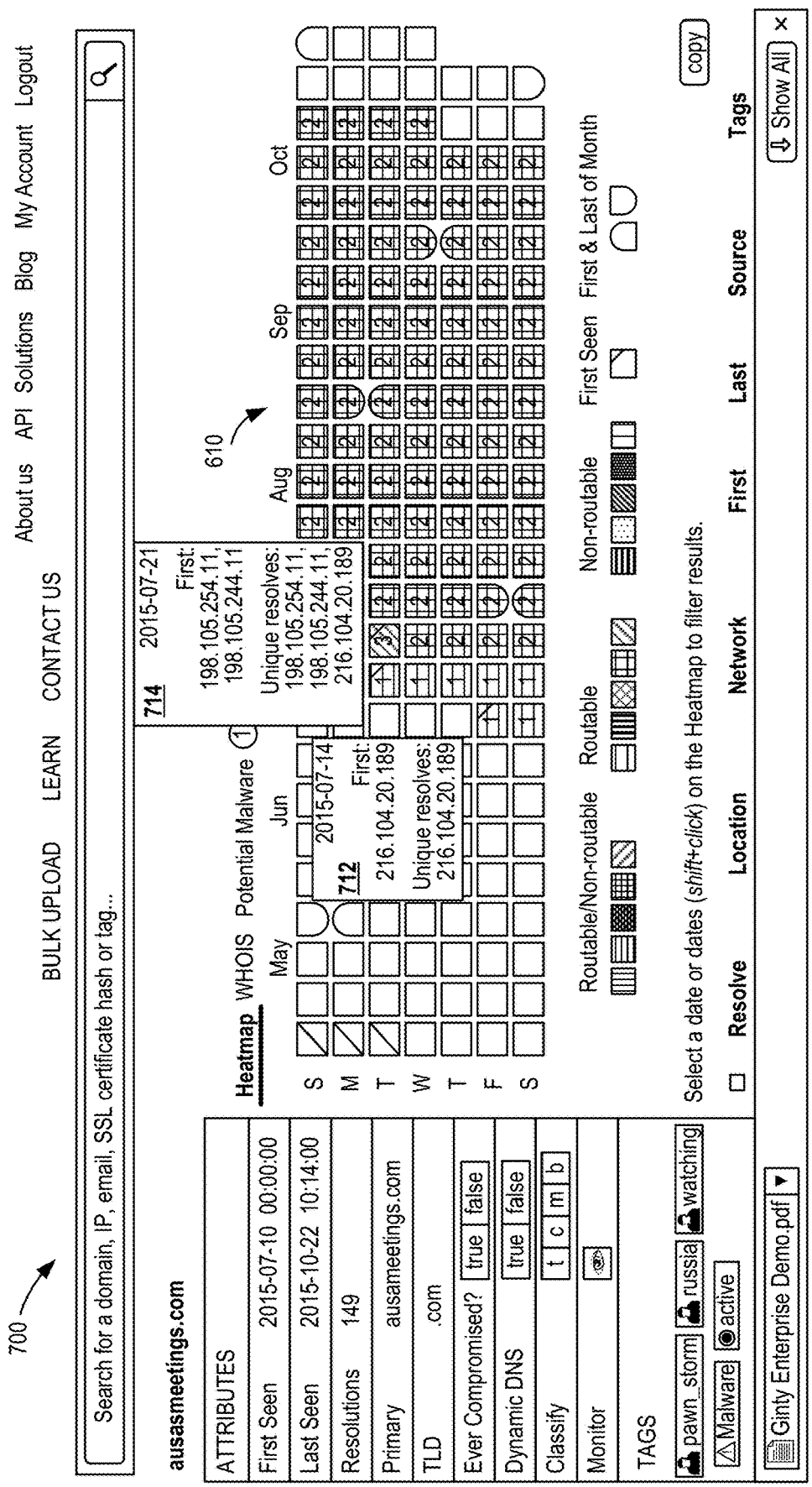
Figure 8:
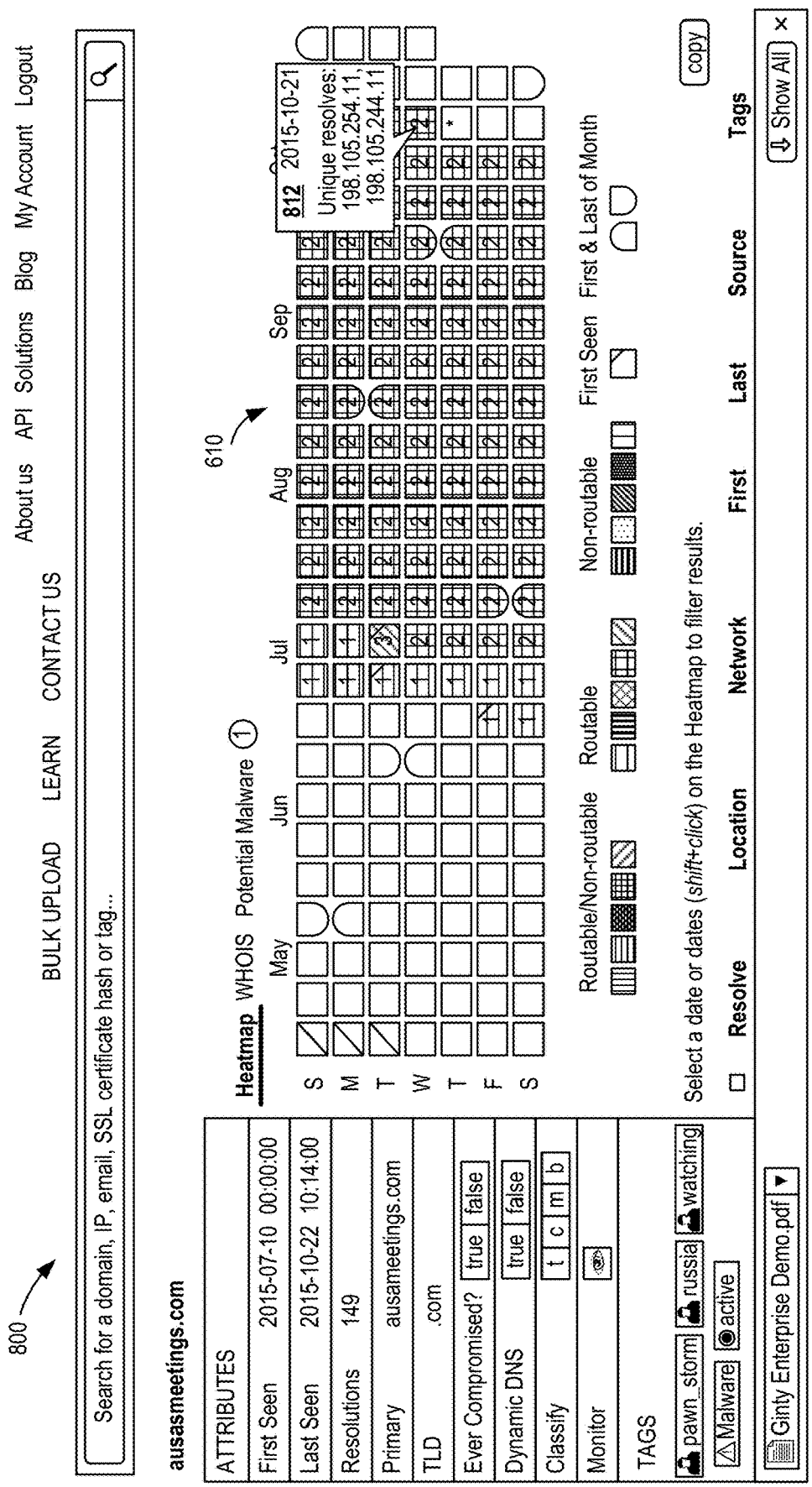

FIGS. 7 and 8 illustrates examples of a graphical interface 700 displaying network data. Graphical interface 700 can include the elements of graphical interface 600, such as graphical interface 610. Graphical interface 610 may be modified from graphical interface 600 and displayed in graphical interface 700 as modified. Continuing with the example in FIG. 6, a user may further interact with graphical interface 610 to display information based on network data for one or more tiles.

In another example, a user may interact (e.g., select or mouse over) another tile in graphical interface 610 during the time period when the Internet domain name ("ausameetings.com") was routable such that one or more IP addresses resolved to the domain name. Graphical interface 700 may display graphical interface 610 with a graphical interface 712 that displays information based on network data for a time period (e.g., 2015-07-14) corresponding to another tile. Graphical interface 712 may display information about distinct network activity such as different IP addresses uniquely resolved to the domain name and/or IP addresses that were resolved for the first time.

In another example, graphical interface 700 may display graphical interface 610 with a graphical interface 714 that displays information based on network data for a time period (e.g., 2015-07-21) corresponding to another tile. Graphical interface 714 may display information about distinct network activity such as different IP addresses uniquely resolved to the domain name and/or IP addresses that were resolved for the first time. In this example, graphical interface 714 may display information about multiple distinct IP addresses that were resolved, two of which were resolved for the first time.

A user interacting with a heat map interface can selectively and efficiently determine network activity for each day during a time period. In doing so, based on the information displayed in a graphical interface such as graphical interface 712 or graphical interface 714, a user can determine a pattern of new or existing IP addresses that resolve to a domain name. The identification of the unique IP addresses can enable a user to determine instantly that a particular IP address or group of IP addresses are being used for resolution of a malicious domain name. The heat map interface prevents a user from having to aggregate, in real-time, volumes of network data and selectively identify unique resolutions for a time period. Having the ability to avoid aggregating network data over a time period, reduces the time for identifying a malicious pattern of IP resolution for a domain name.

In FIG. 8, graphical interface 800 can include the elements of graphical interface 600, such as graphical interface 610. Graphical interface 610 may be modified from graphical interface 600 and displayed in graphical interface 800 as modified. Continuing with the example in FIG. 6, a user may further interact with graphical interface 610 to display information based on network data for one or more tiles.

In another example, graphical interface 800 may display graphical interface 610 with a graphical interface 812 that displays information based on network data for a time period (e.g., 2015-10-21) corresponding to another tile. Graphical interface 812 may display information about distinct network activity such as different IP addresses uniquely resolved to the domain name and/or IP addresses that were resolved for the first time. In this example, graphical interface 714 may display information about multiple distinct IP addresses that were resolved, none of which were resolved for the first time.

This example shows, that for a time period ranging from July 2015 to October 2015, network activity increased such that several IP addresses were resolved as being routed for Internet domain name "ausameetings.com." Towards the end of the time period, a user may notice, based on interaction with the tiles, that several IP addresses previously resolved for the first time in July 2015 have been actively resolved for the domain name. A user may further interact with tiles in the graphical interface 610 towards the end of the time period to identify the same IP addresses being resolved. A user can review the data records for those resolved IP addresses to determine whether the IP address can be identified as malicious. Graphical interfaces 612, 712, 714, 812 displayed upon interaction with a tile can enable a user to determine a beginning and an end of network activity with respect to resolved IP addresses. After further investigation into the data records for the IP address, a user could deduce that network activity for the malicious IP address(es) being resolved over a time period is possibly associated with malicious network activity for the time period.

d. Selectable Tile(s) Heat Map Interface

Figure 9:
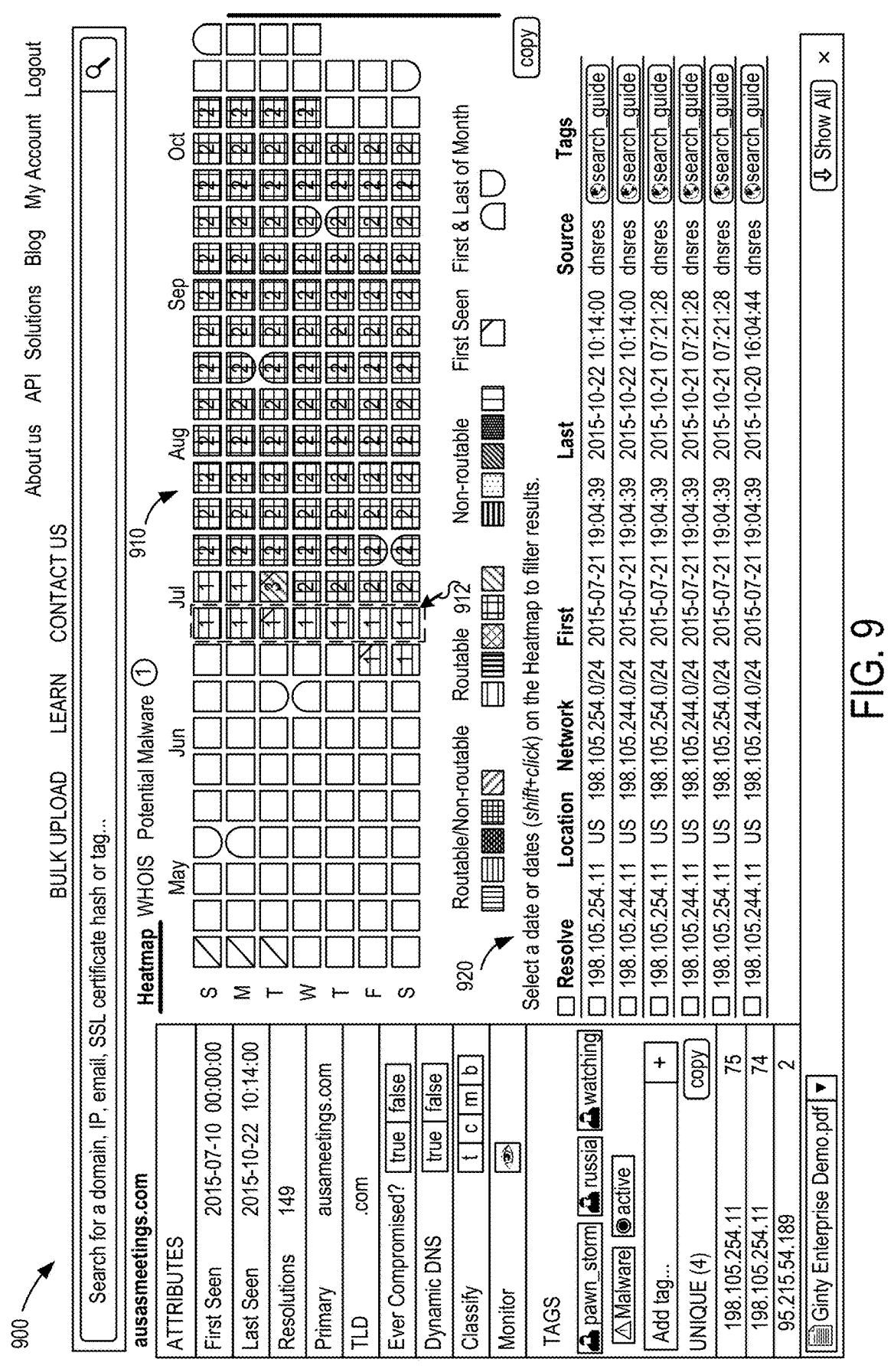

FIG. 9 illustrates an example of a graphical interface 900 displaying network data. Similar to FIG. 4, graphical interface 900 can include the elements of graphical interface 400. Network data may be displayed in a graphical interface 910 including tiles, each represented by an interactive element displaying different data set of a plurality of data sets based on network data, where each data set corresponds to a different time interval. In the example of FIG. 9, each interactive element corresponds to a data set of network data for a time interval of a calendar day. Graphical interface 910 may display network data in a manner as described for graphical interface 410 of FIG. 4. Graphical interface 900 may include a data record interface 920, similar to data record interface 520 in FIG. 5.

As explained above, one or more tiles in a heat map interactive to cause data records to be displayed in graphical interface 900. In at least one embodiment, interaction (e.g., selection) with multiple tiles, such as group of tiles 912 may cause graphical interface 900 to be updated to display multiple data records in data record interface 920. The tiles may correspond to a time period based on the time interval corresponding to each of the tiles. Data record interface 920 may display information about IP addresses that have been resolved for the time interval associated with each of the selected tiles. In some embodiments, data record interface 920 may display distinct IP addresses that have been resolved during the time period based on the selected tiles. In this manner, a user can quickly see more information about unique IP address resolutions during a specific time period of interest.

Figure 10:
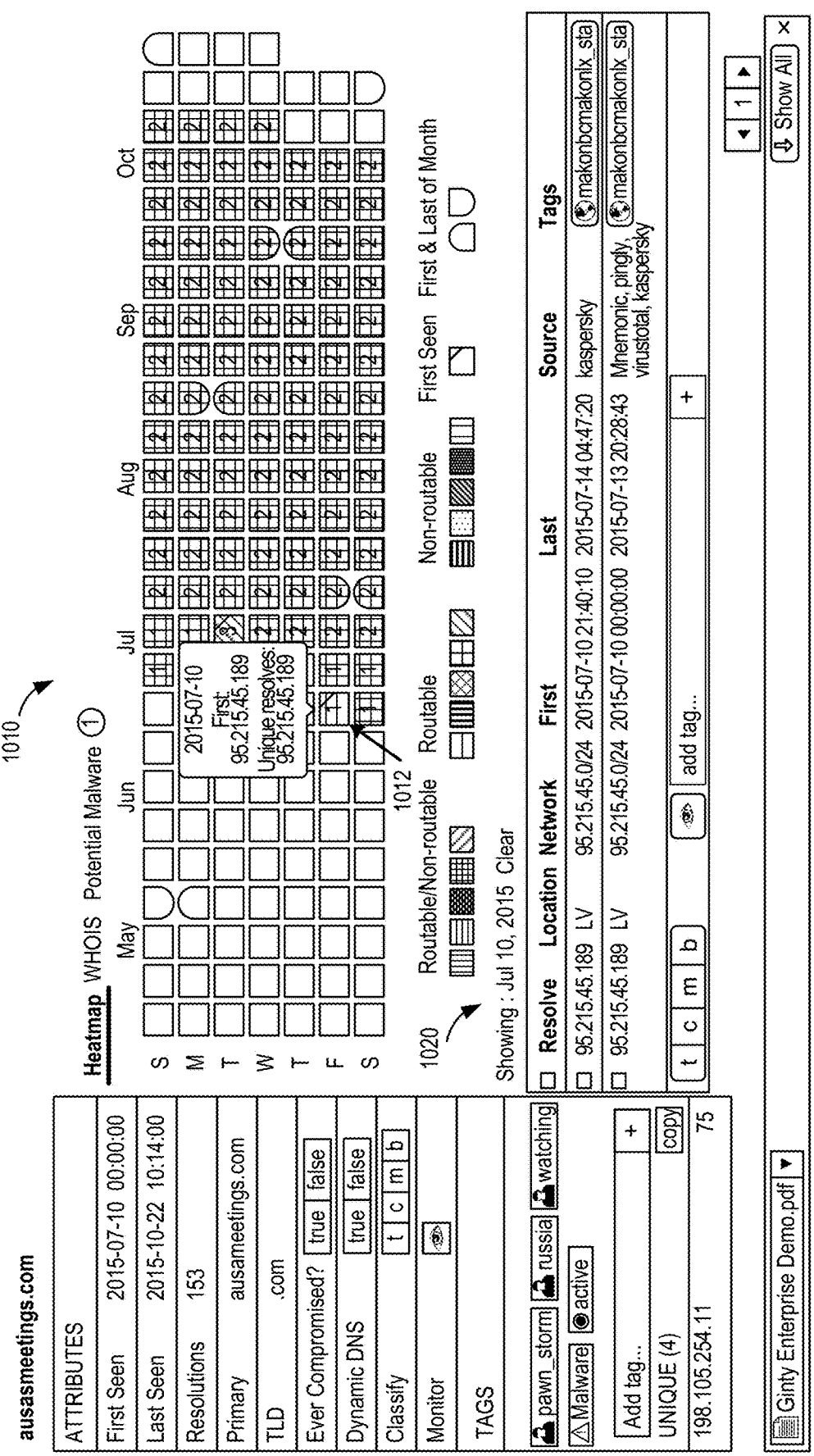

Now turning to FIG. 10, an example is illustrated of a graphical interface 1000 displaying network data. Similar to FIG. 4, graphical interface 1000 can include the elements of graphical interface 400. Network data may be displayed in a graphical interface 1010 including tiles, each represented by an interactive element displaying different data set of a plurality of data sets based on network data, where each data set corresponds to a different time interval. In the example of FIG. 10, each interactive element corresponds to a data set of network data for a time interval of a calendar day. Graphical interface 1010 may display network data in a manner as described for graphical interface 410 of FIG. 4. Graphical interface 1000 may include a data record interface 1020, similar to data record interface 520 in FIG. 5.

In at least one embodiment, data record interface 1020 may be interactive to display information about IP address resolutions that may be flagged as malicious in the data records for the network data corresponding to one or more selected tiles, such as tile 1012. The IP address resolutions shown may be selected based on one or more attributes in the network data corresponding to those IP addresses. The one or more attributes may match criteria selected for monitoring a particular domain name or IP address. As such, each row displayed in data record interface may be displayed as having an appearance that reflects additional information about the IP address resolution. For example, a row may be highlighted red to indicate potential malicious activity associated with the IP address resolution.

In some embodiments, network analysis system 120 may perform processing on the network data for the selected tiles to identify particular IP address resolutions in that network data that have been identified as malicious. IP address resolutions may be identified as malicious based on prior criteria specified by a user or identification of a pattern associated with one or more attributes of the identified IP address resolutions. The display of information about the identified IP address resolutions may be modified based on the significance of an event tied to those IP address resolutions.

Figure 11:
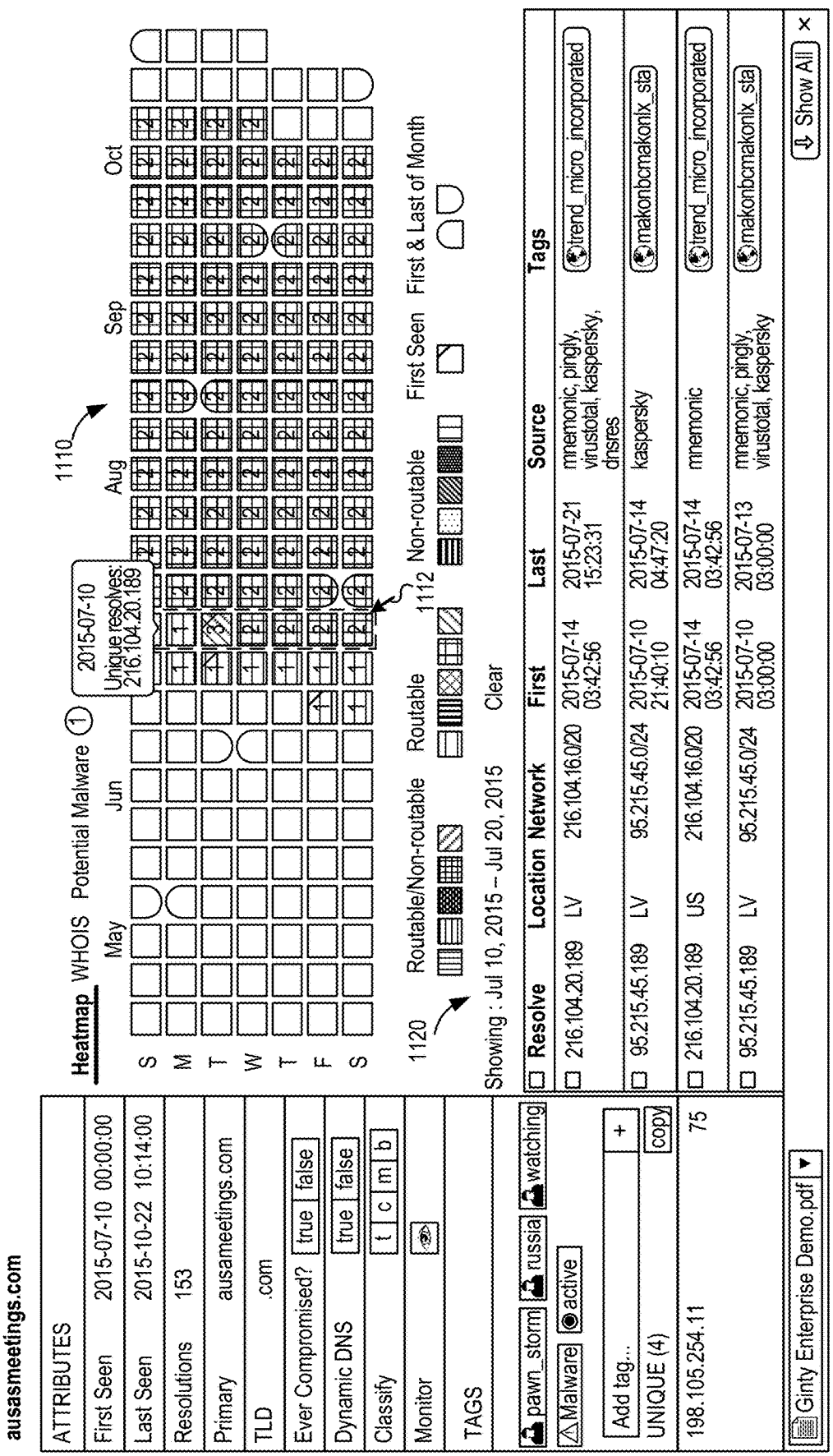

FIG. 11 illustrates an example of a graphical interface 1100 displaying network data. Similar to FIG. 4, graphical interface 1100 can include the elements of graphical interface 400. Network data may be displayed in a graphical interface 1110 including tiles, each represented by an interactive element displaying different data set of a plurality of data sets based on network data, where each data set corresponds to a different time interval. In the example of FIG. 11, each interactive element corresponds to a data set of network data for a time interval of a calendar day. Graphical interface 1110 may display network data in a manner as described for graphical interface 410 of FIG. 4. Graphical interface 1100 may include a data record interface 1120, similar to data record interface 520 in FIG. 5.

In the example of FIG. 11, a group of tiles 1112 may be selected to provide more information in data record interface 1120. As explained above with respect to FIG. 10, network analysis system 120 can identify a pattern associated with IP address resolutions and as such modify data record interface 1120 to indicate different threat levels of network activity with regard to each of the IP address resolutions displayed in data record interface 1120. In the example shown in FIG. 11, data record interface 1120 can display each IP address resolution with a different appearance (e.g., a different color or shading) to indicate a threat level.

e. Adaptable Appearance of Network Activity in Heat Map Interface

Figure 12:
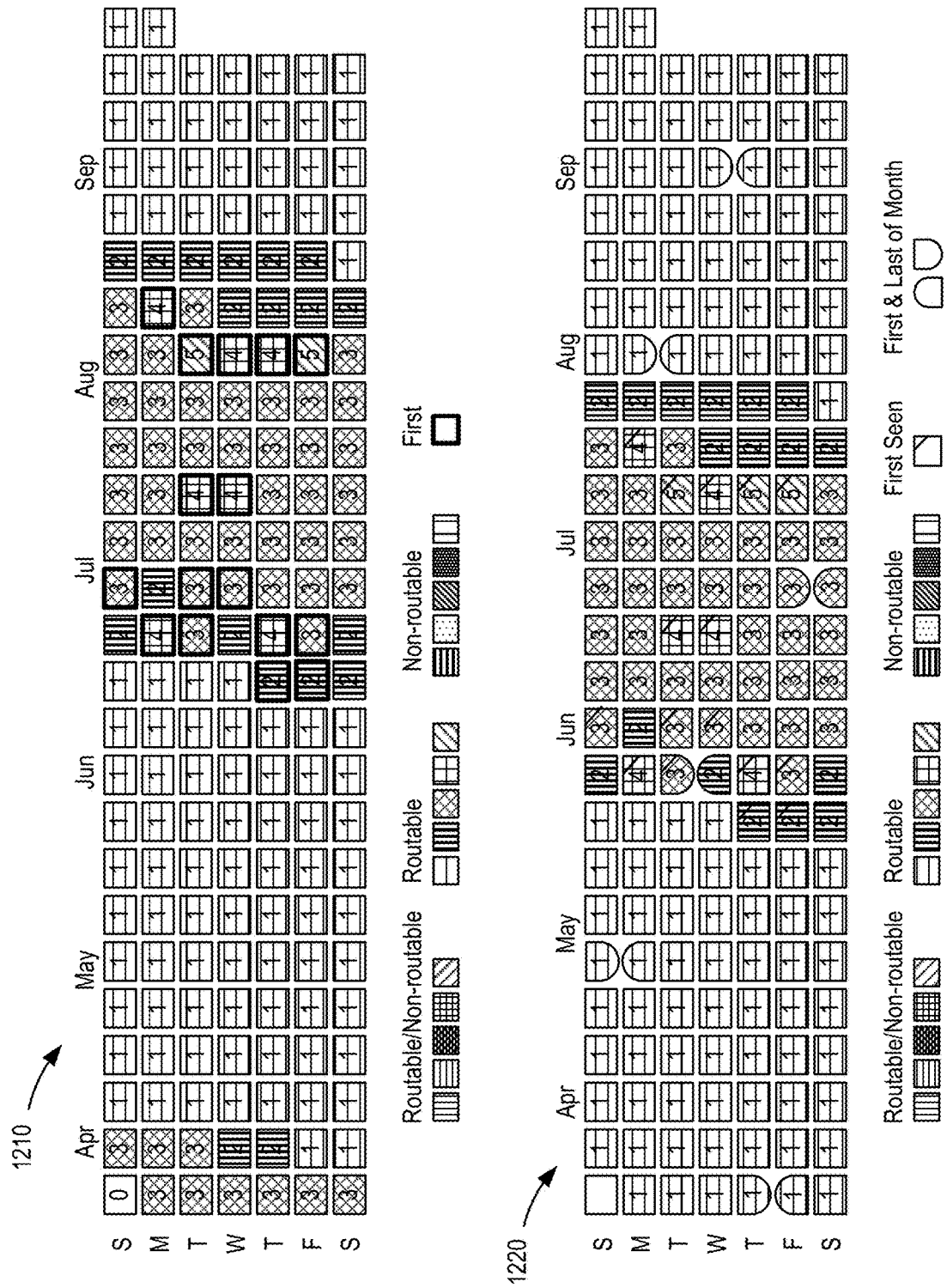
Figure 13:
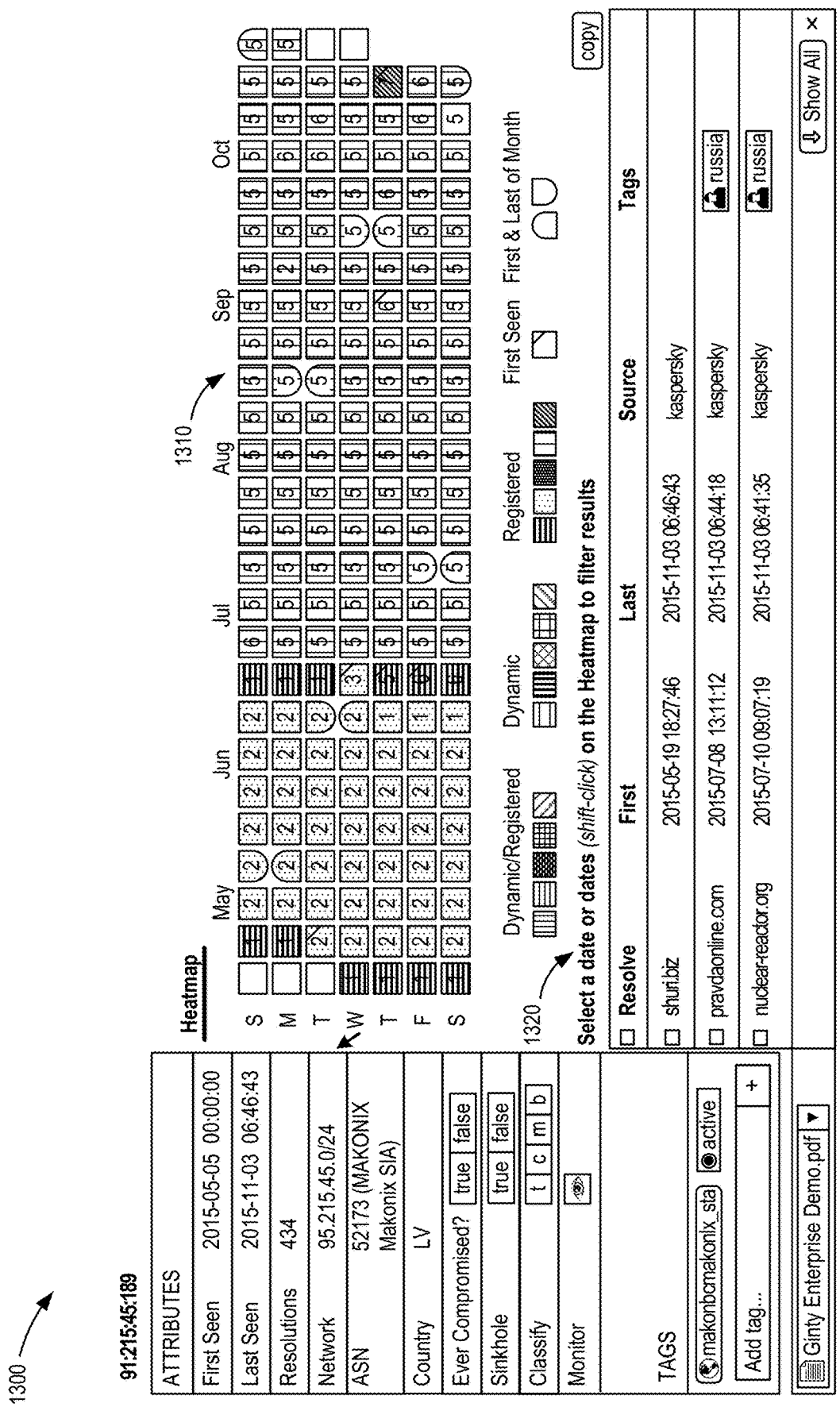

FIG. 12 illustrates another example of graphical interfaces 1210, 1220 displaying network data. Each of graphical interfaces 1210, 1220 may be a heat map graphical interface. The appearance of a heat map interface may be configurable by a user with respect to the type of network data that is displayed in the heat map interface. Either through a graphical interface or data provided to a network analysis system, a user can specify one or more attributes for displaying network data, such as a color, arrangement, configuration, and operation of tiles displayed in a heat map interface.

In one embodiment, graphical interface 1210 may be adapted for displaying a tile, in particular a profile (e.g., an appearance) of a border displayed around a tile to indicate information about network activity with respect to the network data corresponding to the tile. The profile of the border may be modified to have a different color, shading, animation, movement, and/or size to reflect information about the network activity. For example, the profile may be modified to indicate that a new IP address has been resolved for a domain name. Other examples may include modification of the profile to indicate a severity of possible malicious activity or the number of occurrences of a particular network activity. The profile may be modified to correspond to the statistical information displayed in the tile whose border is modified.

In one embodiment, graphical interface 1220 may be configured to modify a profile of a tile, in particular the appearance of a tile. The profile of a tile may be modified such that its appearance distinguishes one or more different events related to network activity in the network data corresponding to the tile. Upon detection of a particular type of network activity or an interesting event, the profile of a tile may be modified so that it has a different appearance (e.g., color, shading, or animation) for other tiles. The appearance of a tile may be modified such that its shape is distinguishable from other tiles. The shape of a tile may be an indicator of information about the network activity determined from the network data corresponding to the tile. In some embodiments, the profile of a tile may be modified such that one or more indicators are placed in the tile. An indicator may have an appearance (e.g., color, shading, or animation) that is different from other tiles. The indicator may be placed in a corner of the tile. A tile can have different indicators, each corresponding to a different corner or portion of a time. Each indicator may indicate different information about the network data corresponding to the tile. For example, one indicator may indicate that there is one or more IP address resolutions associated with malicious activity, and another indicator may indicate that there is a particular number or type of distinct IP address resolutions.

FIG. 12 and other figures described herein illustrate the appearance of multiple tiles changing to provide further indication as to the trend of network activity. In the examples shown in graphical interface 1210 and graphical interface 1220, the appearance of tiles may be modified and vary based on the underlying network data. For example, the appearance of tiles may be altered to show different color reflecting a degree to which IP addresses are routable, such that they are resolved. In other examples shown in figures described below, the different color may reflect the degree to which a domain name is registered such that IP addresses can be routed.

The color may be indicative of the number of occurrences of an event of interest (e.g., IP address resolution), and even further, the number of unique occurrences. The change in appearance of tiles over a time period shown in a graphical interface (e.g., graphical interfaces 1210, 1220) can be indicative of a trend during which IP addresses are being used to malicious route traffic for a domain name of interest.

f. Display of Unique IP Resolutions in Heat Map Interface

FIGS. 13-15 illustrate graphical interfaces that enable network analysis of network activity of domain name resolution for an IP address (e.g., IP address 91:215:45:189). Each of the graphical interfaces may have similar functionality and/or features described with respect to the figures disclosed herein.

In FIG. 13, a graphical interface 1300 is shown with a heat map graphical interface 1310 and a data record interface 1320. The information shown in tiles of graphical interface 1300 is generated based on network data for domain name resolution for a particular IP address. Using previously described techniques, graphical interface 1310 may present tiles, each having a profile of an appearance indicative of network data corresponding to that time. Graphical interface 1310 illustrates a trend or a pattern of domain name resolution for an IP address, such that each tile has either or both of statistical information and an appearance, either of which indicates network activity about the network data for the tile. In the example shown, many of the tiles show statistical information computed by network analysis system. The statistical information can be generated for a tile based on the network data corresponding to the tile.

Data record interface 1320 can display information obtain from data records corresponding to network data for tiles that are interacted with in graphical interface 1310. For example, data record interface 1320 may display information about unique domain names that have resolved to IP addresses for the time period corresponding to the selected tiles. Each row in data record interface may correspond to a different domain resolved to the IP address for which graphical interface 1300 is generated. Each row may indicate information about one or more attributes of a domain resolution such as a first time the domain resolved, a last time the domain resolved, a source of the domain resolution, and one or more tags associated with the domain.

FIG. 14 illustrates a graphical interface 1400 of domain resolutions for an IP address. In the example shown, graphical interface 1400 can include data record interface 1420. Graphical interface 1400 may be modified from graphical interface 1300 to display data record interface 1420 with one or more additional data records. In some embodiments, each row may be associated with a profile that indicates an appearance of the row in data record interface 1420. The profile may be modified to change an appearance of a row to indicate information about network activity with respect to the information displayed for the row. For example, a row may be modified to a red color to indicate possible malicious activity for the domain which was resolved.

FIG. 15 illustrates another example of a graphical interface 1500 for displaying network data about domain names that are resolved for an IP address. In this example, graphical interface 1500 is similar to graphical interface 1400, except that each of the tiles is modified based on additional network data collected for the time period displayed in heat map interface 1510. Similar to FIG. 14, a data record interface 1520 is displayed with information from data records in network data corresponding to selected tiles. In some embodiments, all data records may be shown initially for all tiles that are displayed.

g. WHOIS Data Displayed in a Graphical Interface

FIG. 16 illustrates an example of a graphical interface 1600 that is interactive to display information obtained using WHOIS records about a domain (e.g., "ausameetings.com"). Graphical interface 1600 may include a graphical interface 1610. Graphical interface 1600 may be displayed based on interaction with graphical interface 400 of FIG. 4. For example, graphical interface 1600 may include one or more interactive elements (e.g., "Heatmap," "WHOIS," and "Potential Malware"), each of which is interactive to cause graphical interface to be modified to include a graphical interface that displays information about each of the different categories associated with the interactive element. For example, graphical interface 1600 may include interactive elements for each of the following categories, "Heatmap," "WHOIS," and "Potential Malware." Interaction with "heatmap" may cause a heat map interface to be displayed. Interaction with "WHOIS" may cause graphical interface 1610 to be displayed with information obtained from WHOIS registration records about a domain ("ausameetings.com"). Information about WHOIS registration may include, without limitation, date checked, WHOIS server, registrar, created, updated, expiration date, name servers, email, name, organization, address, and contact information.

In some embodiments, graphical interface 1610 may be updated with WHOIS information about a domain corresponding to a row selected in data record interface 1620. Data record interface 1620 may be previously displayed based on interaction with a heat map interface.

h. Potential Malware Information Displayed in a Graphical Interface

FIG. 17 illustrates an example of a graphical interface 1700 for displaying information about potential malware based on network data. Graphical interface 1700 may include one or more interactive elements (e.g., "Heatmap," "WHOIS," and "Potential Malware"), each of which is interactive to cause graphical interface to be modified to include a graphical interface that displays information about each of the different categories associated with the interactive element. For example, graphical interface 1700 may include interactive elements for each of the following categories, "Heatmap," "WHOIS," and "Potential Malware." Graphical interface 1700 may be similar to graphical interface 1600. Interaction with "Potential Malware" may cause graphical interface 1700 to include graphical interface 1710. Graphical interface 1710 may display information about potential malware identified by a source for the network data for IP addresses that have resolved for a domain. For example, graphical interface 1710 may display one or more sources of malware for the tiles selected in a heat map interface. The one or more sources may be displayed for those IP addresses included in the network data for selected tiles.

i. Potential Malware Information Displayed in a Graphical Interface

Figure 18:
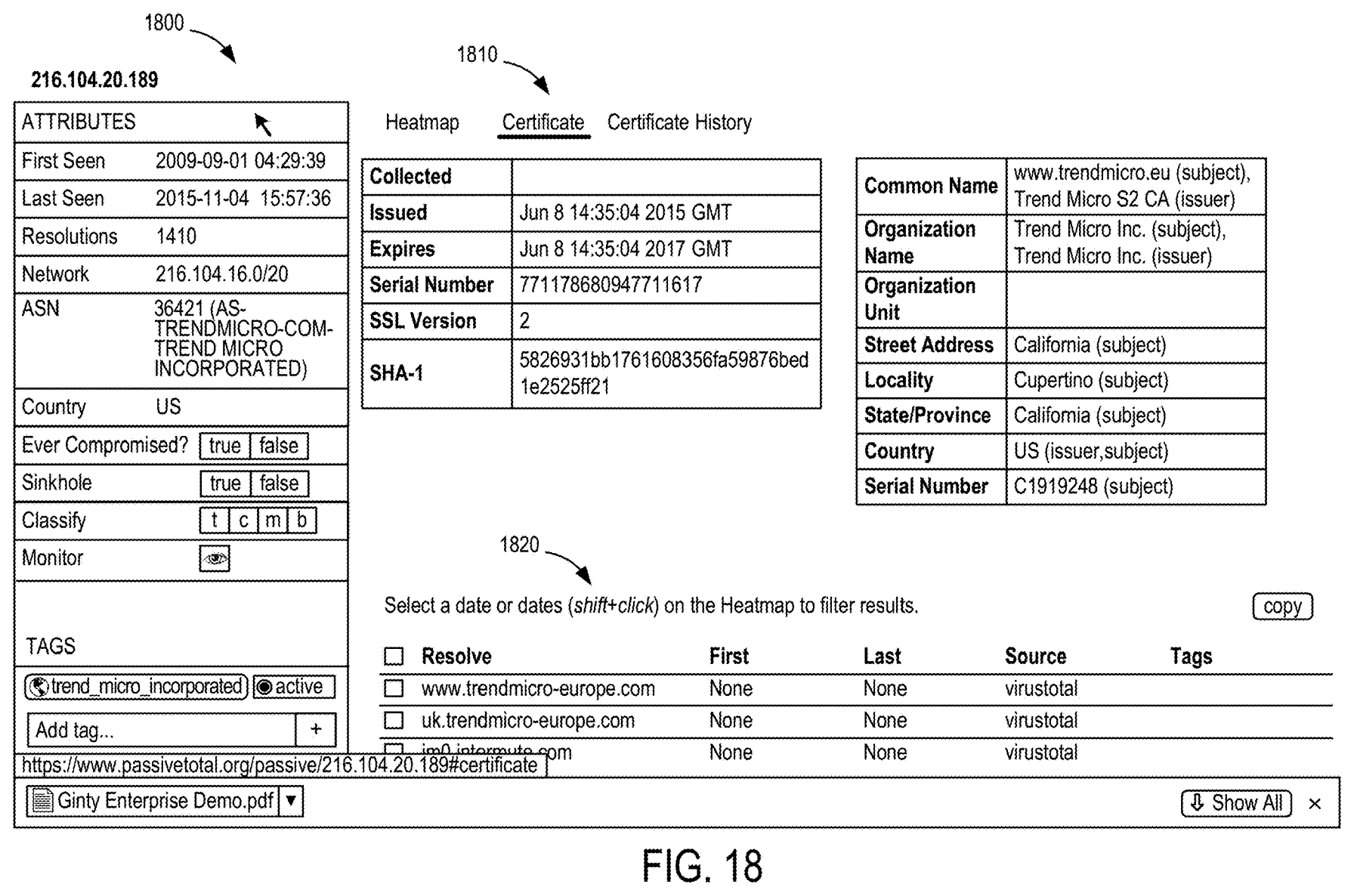

FIG. 18 illustrates an example of a graphical interface 1800 for displaying information about certificate information for IP and/or domain resolution. Graphical interface 1800 may include one or more interactive elements (e.g., "Heatmap," "Certificate," and "Certificate History"), each of which is interactive to cause graphical interface to be modified to include a graphical interface that displays information about each of the different categories associated with the interactive element. For example, graphical interface 1800 may include interactive elements for each of the following categories, "Heatmap," "Certificate," and "Certificate History." Graphical interface 1800 may be similar to graphical interface 1800. Interaction with any of the interactive elements for the categories may cause graphical interface 1800 to be updated with information about that category for an IP address or a domain. The IP or domain may be based on selection of an IP address or a domain for a data record in a data record interface 1820.

Interaction with "Certificate" may cause graphical interface 1800 to include graphical interface 1810. Graphical interface 1810 may display information about a certificate for domain that has resolved for an IP address. For example, graphical interface 1810 may display certificate information for a domain identified in network data corresponding to a tile selected in a heat map interface.

Interaction with "Certificate History" may cause graphical interface 1800 to include graphical interface 1810. Graphical interface 1810 may display information about a certificate history for domain that has resolved for an IP address. For example, graphical interface 1810 may display certificate history for a domain identified in network data corresponding to a tile selected in a heat map interface.

j. Discover Query Interface

Figure 19:
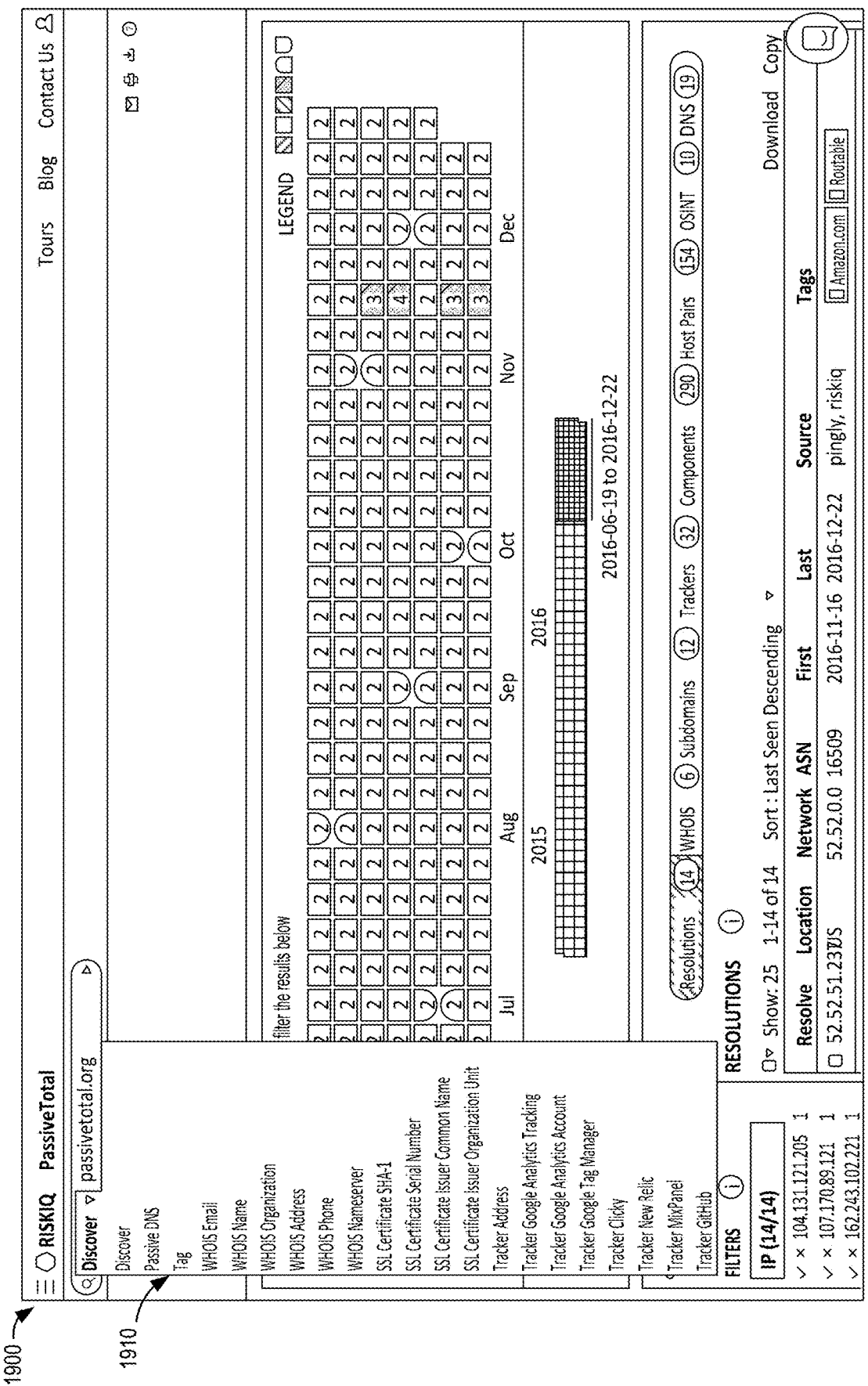
Figure 20:
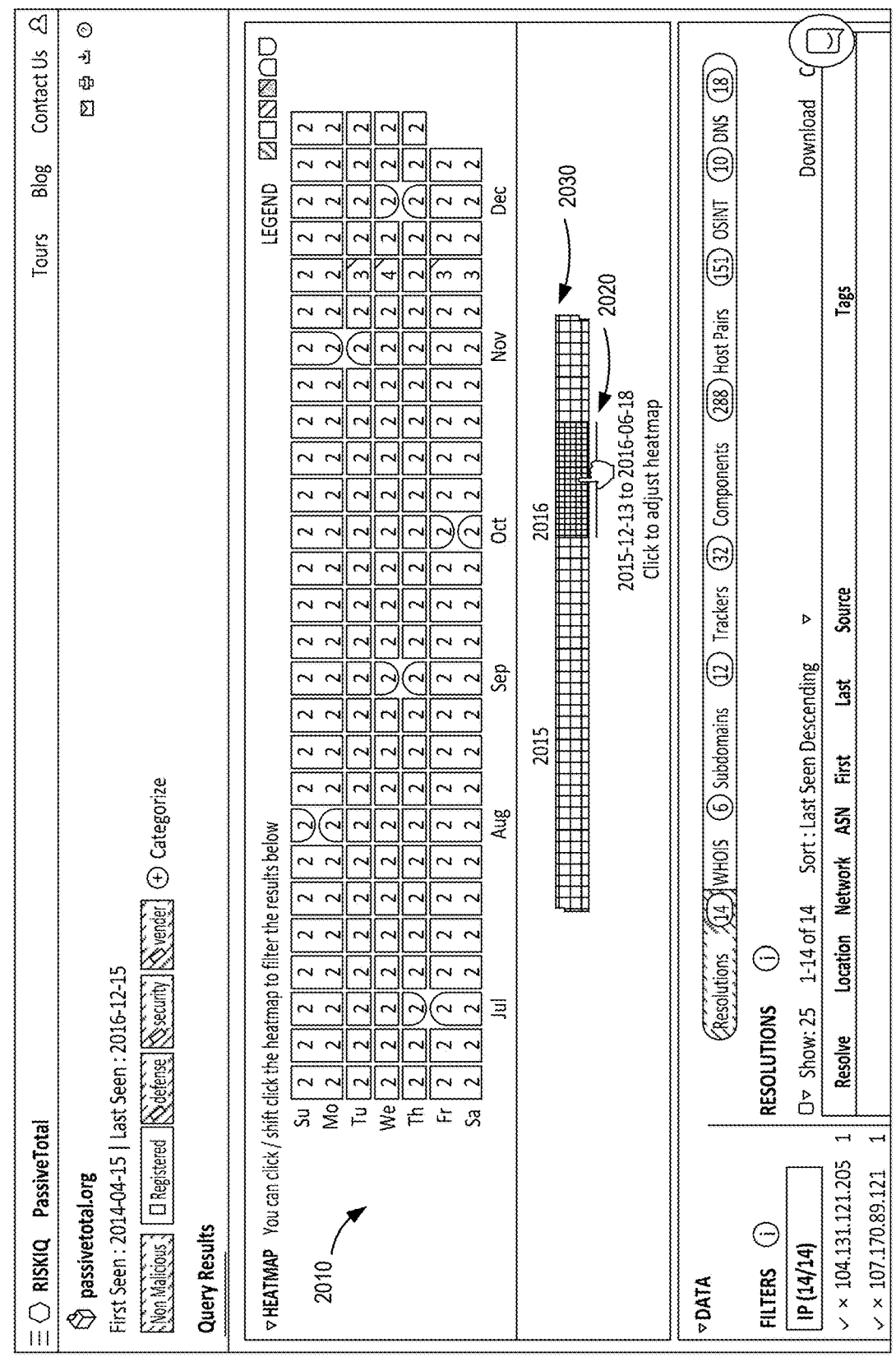

FIG. 19 illustrates an example of a graphical interface 1900 for enabling a user to request a specific query ("discover query") of network data. Graphical interface 1900 may include a search interface such as search interface 430 of FIG. 4. Search interface 530 may present one or more options for selecting a defined query having one or more criteria. The criteria may be directed to one or more attributes for one or more types of network data. The options may be interactive elements. A graphical interface such as a heat map interface may be displayed interface 1900 based on network data accessed for a query specified using search interface 1910.

k. Time Bar

FIG. 20 illustrates an example of a graphical interface 2000 for enabling a user to selectively specify one or more attributes for displaying network data. In the example of FIG. 20, graphical interface 2000 may display network data in a graphical interface 2010 ("HEATMAP"). Graphical interface 2000 may include one or more elements 2020 (e.g., a scroll bar) to provide input to specify one or more criteria for displaying network data. The elements 2020 may be presented before or after network data is displayed in interface 2010.

In some embodiments, it may be desirable to limit the network data shown in interface 2010 for a particular time period so that network activity can be assessed. Interface 2010 may display network data in an initial view based on a particular time period. Element 2030 may provide a visual representation of a time period for which network data is accessed. Element 2020 may receive input to control a subset or portion of the time period for which to display network data. Element 2030 provides a visual representation of the network data based on visual indicators corresponding to information determined for the network data underlying the time period. The visual representation may be useful to determine a portion of the time period to select using element 2020. The portion of the time period selected may enable a user to view a slice of a total time period of network activity for focused investigation. In some embodiments, the network data displayed in interface 2010 may be updated based on current network data for the time period selected.

l. Viewing Resolutions Data

Figure 21:
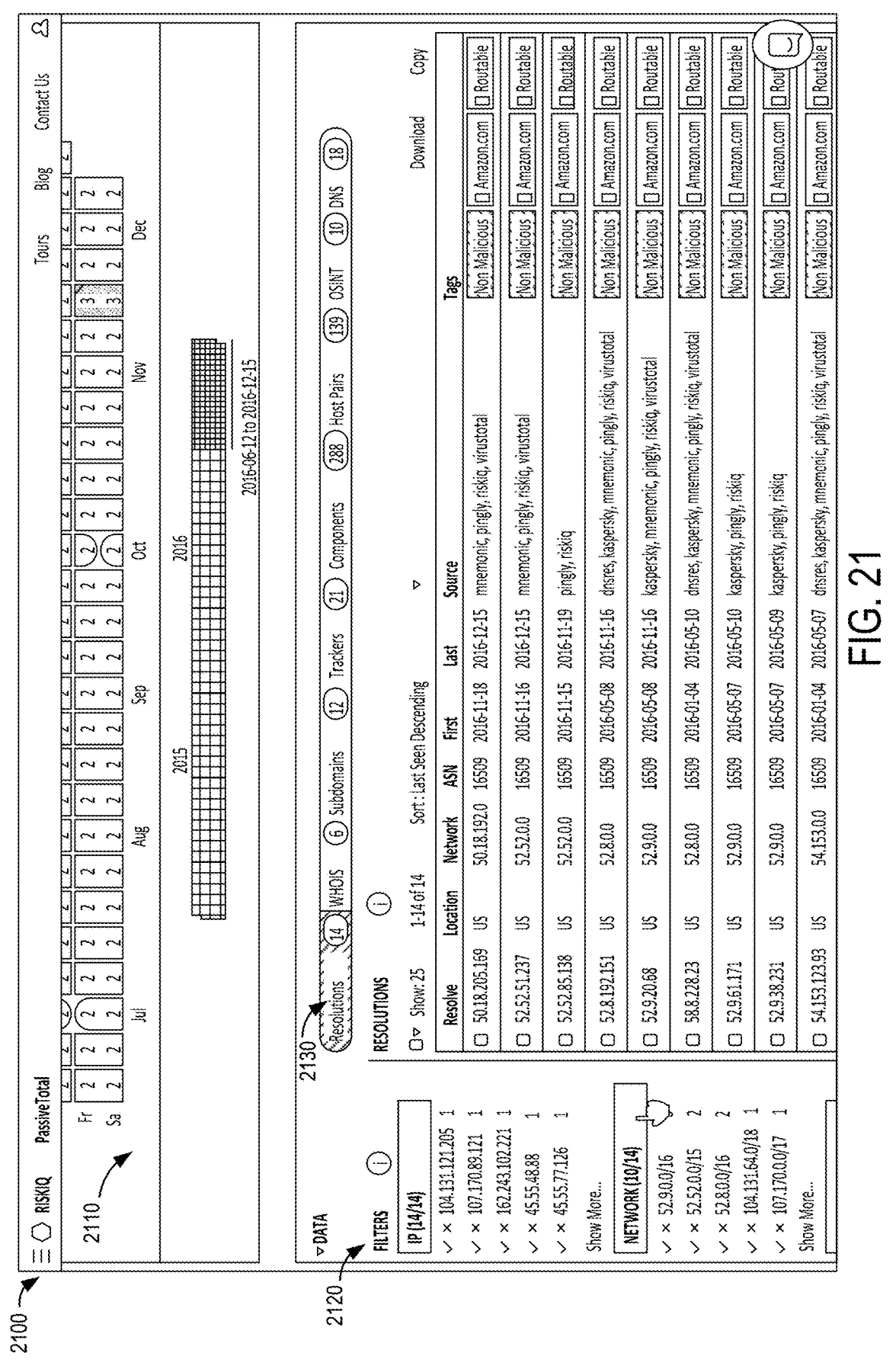

FIG. 21 illustrates an example of a graphical interface 2100 for enabling a user to selectively filter and view network data for network activity corresponding to a heat map interface. In the example of FIG. 21, graphical interface 2100 may display network data in a graphical interface 2110 ("HEATMAP"). Graphical interface 2100 may include a data record interface 2130 to display information about network data in data records (e.g., data sets) corresponding to the network data displayed in the graphical interface 2110. Interaction with a tile in the graphical interface 2110 may cause the data records displayed in interface 2130 to change or be modified.

In the example of FIG. 21, interface 2130 shows data records about network activity corresponding to network data selected based on an attribute, e.g., an Internet domain. Each of the data records may be presented with a visual appearance to indicate statistical information or other information about network activity related to those records. Interface 2120 may be a filter interface to selectively filter the data records shown in interface 2130. The filters may be presented based on each of the different attributes associated with the network data. For example, in FIG. 21, each data record for a resolution may indicate a resolved IP address, a location, an network, dates when the IP address was resolved, etc. The filters may correspond to the values for each of the attributes. Selecting or unselecting one or more values for attributes can limit the data records shown. Interface 2110 may be updated to display network data based on the filtered records. In doing so, a user can view certain types of threats related to specific attributes. For example, a user can focus on IP addresses resolved to a particular network or location, which may appear to be malicious.

m. Viewing WHOIS Registration Data

FIG. 22 illustrates an example of a graphical interface 2200 for enabling a user to view WHOIS data records related to network data displayed in heat map interface. In the example of FIG. 22, graphical interface 2200 may display network data in a graphical interface ("HEATMAP"), such as interface 2010 of FIG. 20. Graphical interface 2200 may include a data record interface 2230 to display information about network data in data records (e.g., data sets) corresponding to the network data displayed in the graphical interface 2010. Interaction with a tile in a heat map interface may cause the data records displayed in interface 2230 to change or be modified. The information showed interface 2230 might include the type of information shown in FIG. 16.

In some embodiments, graphical interface 2200 may display change history about WHOIS records corresponding to network data. Element(s) 2220 may be interactive to select a date from dates on which a change occurred in WHOIS records. In some embodiments, interface 2230 may be interactive to conduct a reverse WHOIS search. Interaction with the element 2220 may cause interface 2230 to display WHOIS data records corresponding to the date. The network data displayed in the heat map interface may be modified to reflect the WHOIS data records.

n. Viewing Subdomains Data

Figure 23:
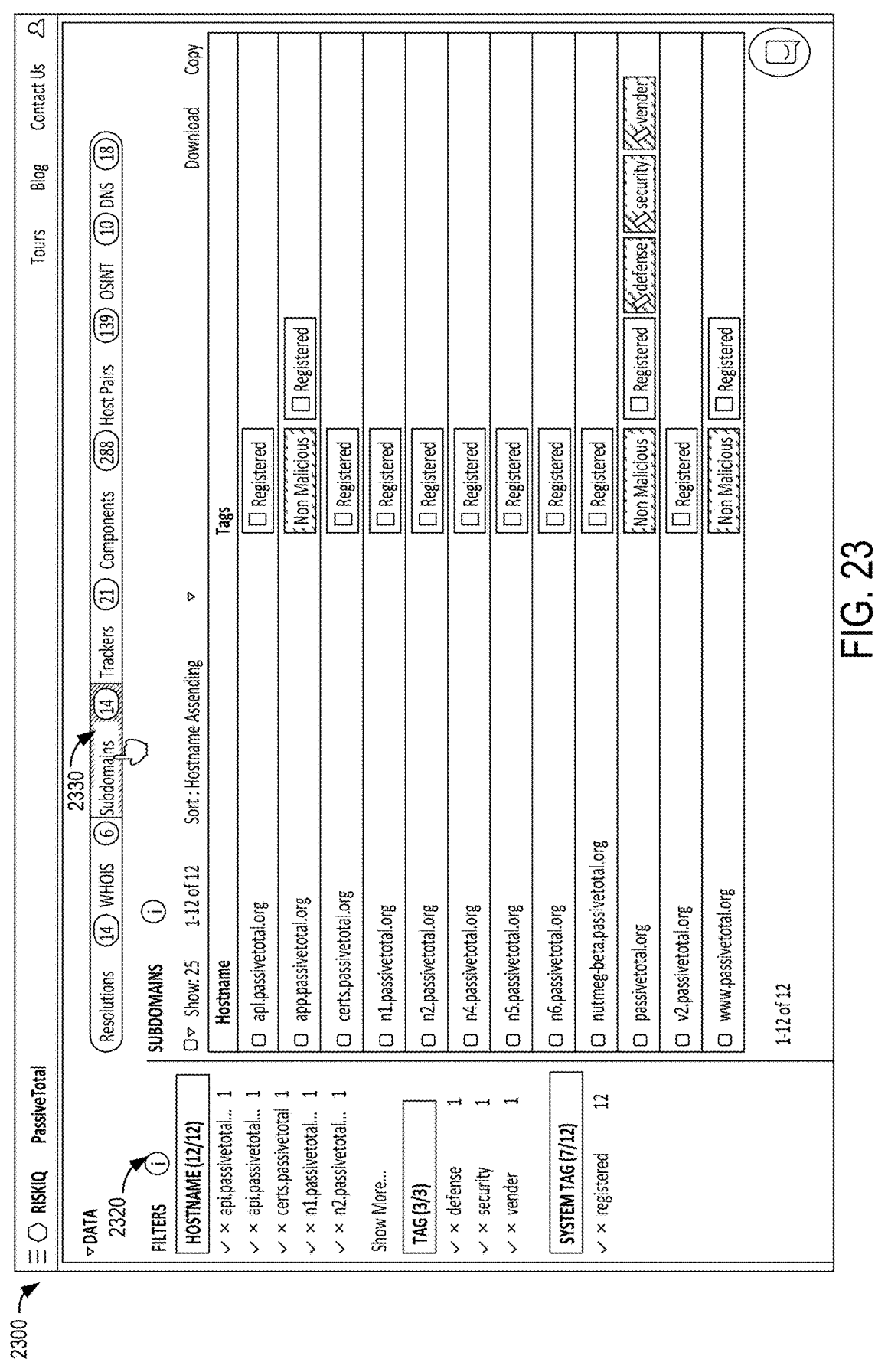

FIG. 23 illustrates an example of a graphical interface 2300 for enabling a user to selectively filter and view network data for network activity corresponding to a heat map interface. In the example of FIG. 23, graphical interface 2300 may display network data in a graphical interface 2010 ("HEATMAP"). Graphical interface 2300 may include a data record interface 2330 to display information about network data in data records (e.g., data sets) corresponding to the network data displayed in the graphical interface 2010. Interaction with a tile in the graphical interface 2010 may cause the data records displayed in interface 2330 to change or be modified.

In the example of FIG. 23, interface 2330 shows data records about network activity ("subdomains") corresponding to network data selected based on an attribute, e.g., an Internet domain. Interface 2330 shows an example of subdomain network data determined for the network data displayed in a heat map interface. Each of the data records may be presented with a visual appearance to indicate statistical information or other information about network activity related to those records. Interface 2320 may be a filter interface to selectively filter the data records shown in interface 2330. The filters may be presented based on each of the different attributes associated with the network data. For example, in FIG. 23, each data record for a subdomain may indicate a hostname, a tag, a system tag, etc. The filters may correspond to the values for each of the attributes. Selecting or unselecting one or more values for attributes can limit the data records shown. A heat map interface may be updated to display network data based on the filtered records about subdomains.

o. Viewing Trackers Data

FIG. 23 illustrates an example of a graphical interface 2400 for enabling a user to selectively filter and view network data for network activity corresponding to a heat map interface. In the example of FIG. 24, graphical interface 2400 may display network data in a graphical interface 2010 ("HEATMAP"). Graphical interface 2400 may include a data record interface 2430 to display information about network data in data records (e.g., data sets) corresponding to the network data displayed in the graphical interface 2010. Interaction with a tile in the graphical interface 2010 may cause the data records displayed in interface 2430 to change or be modified.

In the example of FIG. 24, interface 2430 shows data records ("trackers") about network activity related to tracked identification information. The identification information may correspond to a tracking identifier such as a Google analytics identifier. The data records may correspond to tracked hosts in the network data displayed in interface 2010. Similar to FIG. 20, each of the data records in interface 2430 may show network data for host systems that are tracked for network activity in the network data for the interface 2010. Data records interface 2430 may display attributes about host systems that are tracked based on one or more types of IDs (e.g., Google analytics ID or Twitter ID).

Interface 2430 shows an example of tracker network data determined for the network data displayed in a heat map interface. Each of the data records may be presented with a visual appearance to indicate statistical information or other information about network activity related to those records. Interface 2420 may be a filter interface to selectively filter the data records shown in interface 2430. The filters may be presented based on each of the different attributes associated with the network data. For example, in FIG. 24, each data record for a tracked host system may indicate a hostname, a first seen date, a last seen date, a type of ID, a value, a tag, etc. The filters may correspond to the values for each of the attributes. Selecting or unselecting one or more values for attributes can limit the data records shown. A heat map interface may be updated to display network data based on the filtered records about tracked host systems.

p. Viewing Component Data

Figure 25:
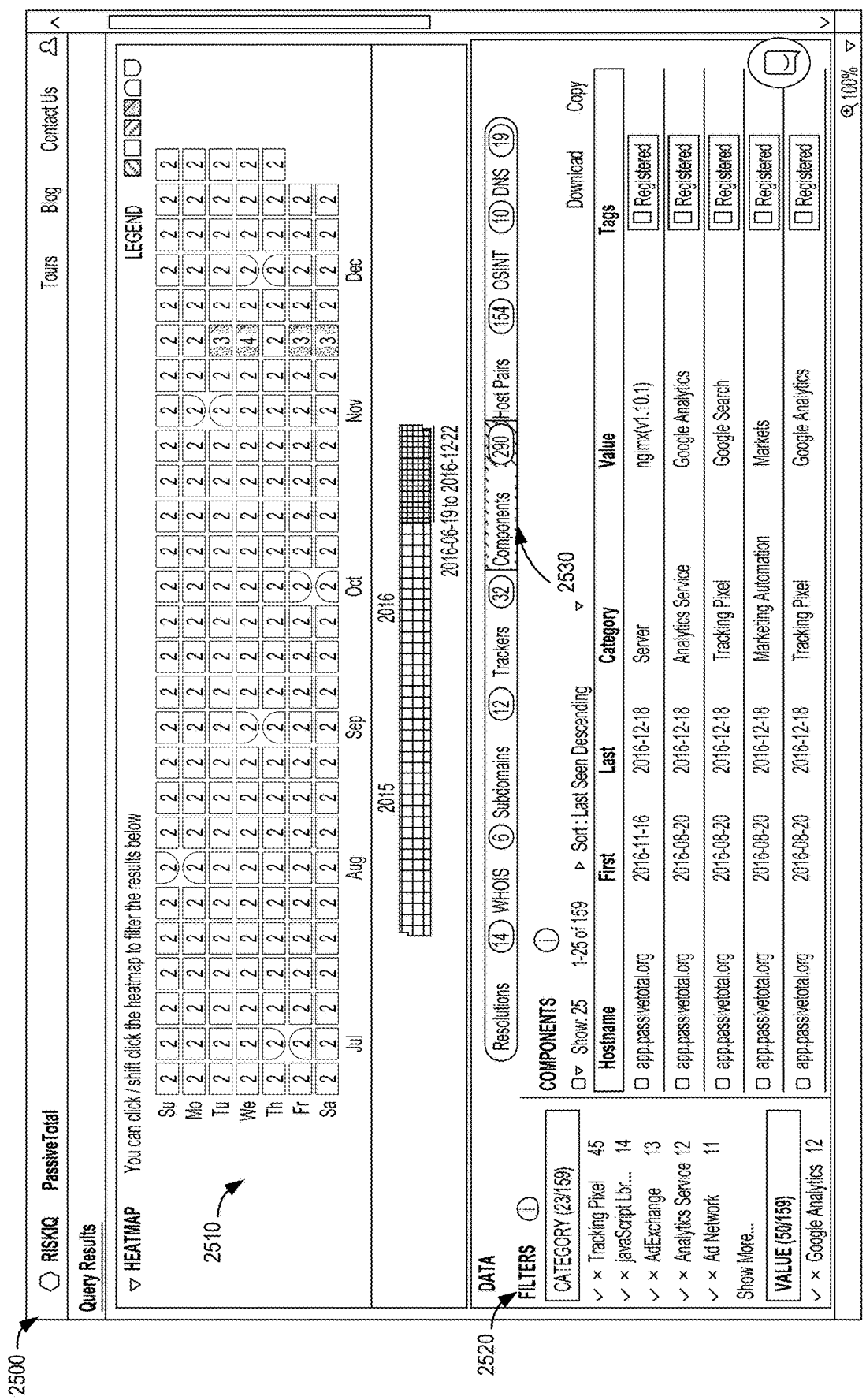

FIG. 25 illustrates an example of a graphical interface 2500 for enabling a user to selectively filter and view network data for network activity corresponding to a heat map interface. In the example of FIG. 25, graphical interface 2500 may display network data in a graphical interface 2510 ("HEATMAP"). Interface 2510 may be similar to interface 2010. Graphical interface 2500 may include a data record interface 2530 to display information about network data in data records (e.g., data sets) corresponding to the network data displayed in the graphical interface 2510. Interaction with a tile in the graphical interface 2510 may cause the data records displayed in interface 2530 to change or be modified.

In the example of FIG. 25, interface 2530 shows data records ("components") about network activity related to tracked assets, such as components. The components may be identified by network analysis system 120 to detect components for network activity identified in the network data. Components may include assets such as a host system and a category of component for the host system. The data records may correspond to components identified in the network data displayed in interface 2010. Similar to FIG. 20, each of the data records in interface 2530 may show network data for host systems that are tracked for network activity in the network data for the interface 2010. Data records interface 2530 may display attributes about host systems that are tracked based on one or more components.

Interface 2530 shows an example of component network data determined for the network data displayed in a heat map interface. Each of the data records may be presented with a visual appearance to indicate statistical information or other information about network activity related to those records. Interface 2520 may be a filter interface to selectively filter the data records shown in interface 2530. The filters may be presented based on each of the different attributes associated with the network data. For example, in FIG. 25, each data record for a tracked host system may indicate a hostname, a first seen date, a last seen date, a category of component, a value, a tag, etc. The filters may correspond to the values for each of the attributes. Selecting or unselecting one or more values for attributes can limit the data records shown. A heat map interface may be updated to display network data based on the filtered records about components that are identified.

q. Viewing Host Pairs Data

Figure 26:
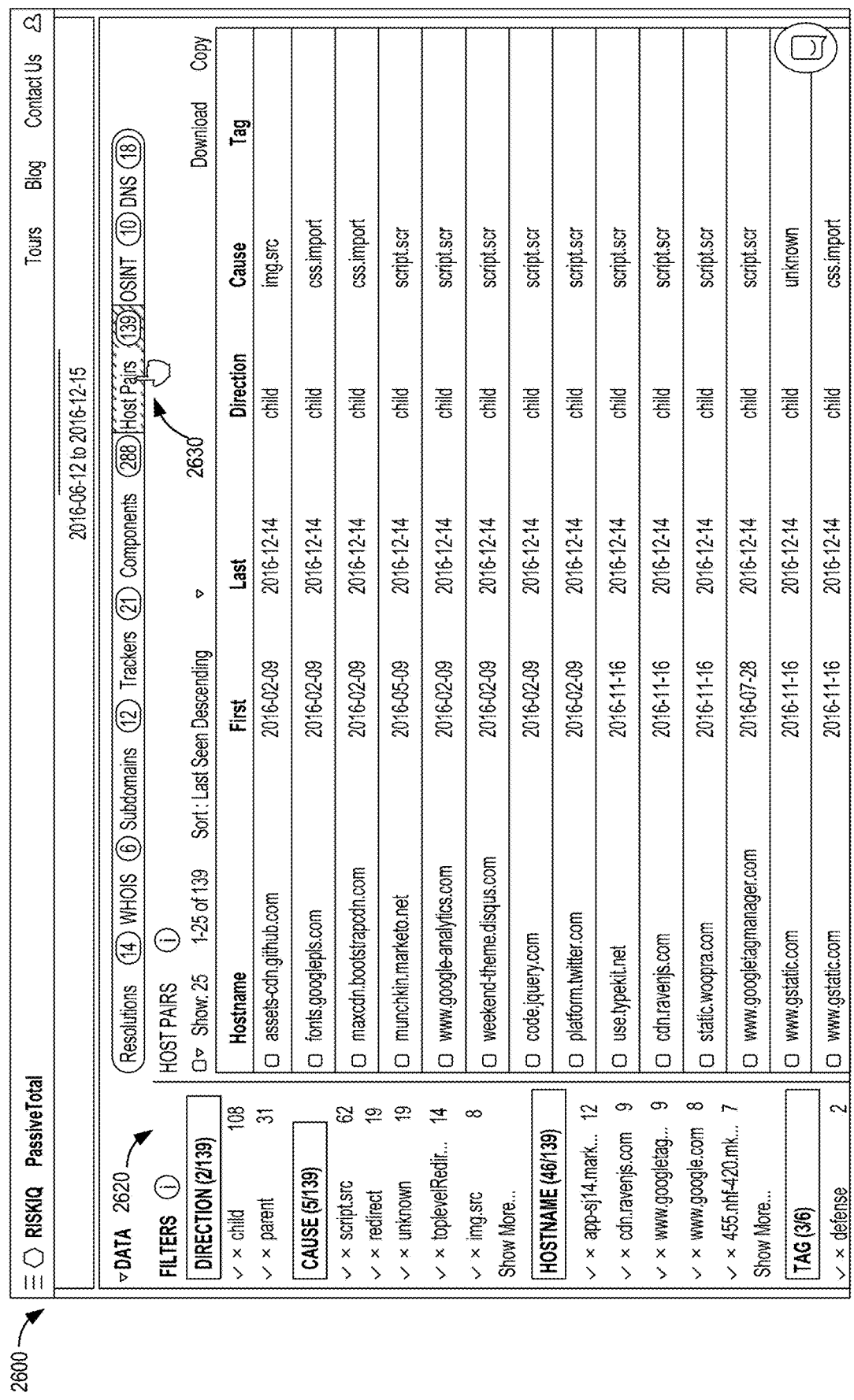

FIG. 26 illustrates an example of a graphical interface 2600 for enabling a user to selectively filter and view network data for network activity corresponding to a heat map interface. In the example of FIG. 26, graphical interface 2600 may display network data in a graphical interface 2010 ("HEATMAP") of FIG. 20. Graphical interface 2600 may include a data record interface 2630 to display information about network data in data records (e.g., data sets) corresponding to the network data displayed in the graphical interface 2010. Interaction with a tile in the graphical interface 2610 may cause the data records displayed in interface 2630 to change or be modified.

In the example of FIG. 26, interface 2630 shows data records ("host pairs") about network activity related to a relationship (e.g., parent—child relationship) identified between network activity. The host pairs may be identified by network analysis system 120 to detect relationships in network activity identified in the network data. Host pairs may include assets such as a host system and information about the relationship. The data records may correspond to assets identified in the network data displayed in interface 2010. Similar to FIG. 20, each of the data records in interface 2630 may show network data for host systems that are identified as having a relationship to the network activity in the network data for the interface 2010. Data records interface 2630 may display attributes about host systems that are identified as related in the network data.

Interface 2630 shows an example of host pairs network data determined for the network data displayed in a heat map interface. Each of the data records may be presented with a visual appearance to indicate statistical information or other information about network activity related to those records. Interface 2620 may be a filter interface to selectively filter the data records shown in interface 2630. The filters may be presented based on each of the different attributes associated with the network data. For example, in FIG. 26, each data record for a related host system may indicate a hostname, a first seen date, a last seen date, a direction of relationship, a cause, a tag, etc. The filters may correspond to the values for each of the attributes. Selecting or unselecting one or more values for attributes can limit the data records shown. A heat map interface may be updated to display network data based on the filtered records about host pairs that are identified.

r. Viewing DNS Data

FIG. 27 illustrates an example of a graphical interface 2700 for enabling a user to selectively filter and view network data for network activity corresponding to a heat map interface. In the example of FIG. 27, graphical interface 2700 may display network data in a graphical interface 2010 ("HEATMAP") of FIG. 20. Graphical interface 2700 may include a data record interface 2730 to display information about network data in data records (e.g., data sets) corresponding to the network data displayed in the graphical interface 2010. Interaction with a tile in the graphical interface 2710 may cause the data records displayed in interface 2730 to change or be modified.

In the example of FIG. 27, interface 2730 shows data records ("DNS") about DNS activity identified in the network data for which interface 2010 is presented. The DNS data may be identified by network analysis system 120 using active and passive DNS aggregation and analysis techniques. DNS data may include information about DNS assets. Similar to FIG. 20, each of the data records in interface 2730 may show network data for DNSs that are identified as having a relationship to the network activity in the network data for the interface 2010. Data records interface 2730 may display attributes about host systems that are identified as related in the network data.

Interface 2730 shows an example of DNS network data determined for the network data displayed in a heat map interface. Each of the data records may be presented with a visual appearance to indicate statistical information or other information about network activity related to those records. Interface 2720 may be a filter interface to selectively filter the data records shown in interface 2730. The filters may be presented based on each of the different attributes associated with the network data. For example, in FIG. 27, each data record for a DNS record system may indicate a value (e.g., DNS server), a first seen date, a last seen date, a type of DNS, etc. The filters may correspond to the values for each of the attributes. Selecting or unselecting one or more values for attributes can limit the data records shown. A heat map interface may be updated to display network data based on the filtered records about DNSs that are identified.

IV. Computer Systems for a Network Analysis System and Client System(s)

Figure 28:
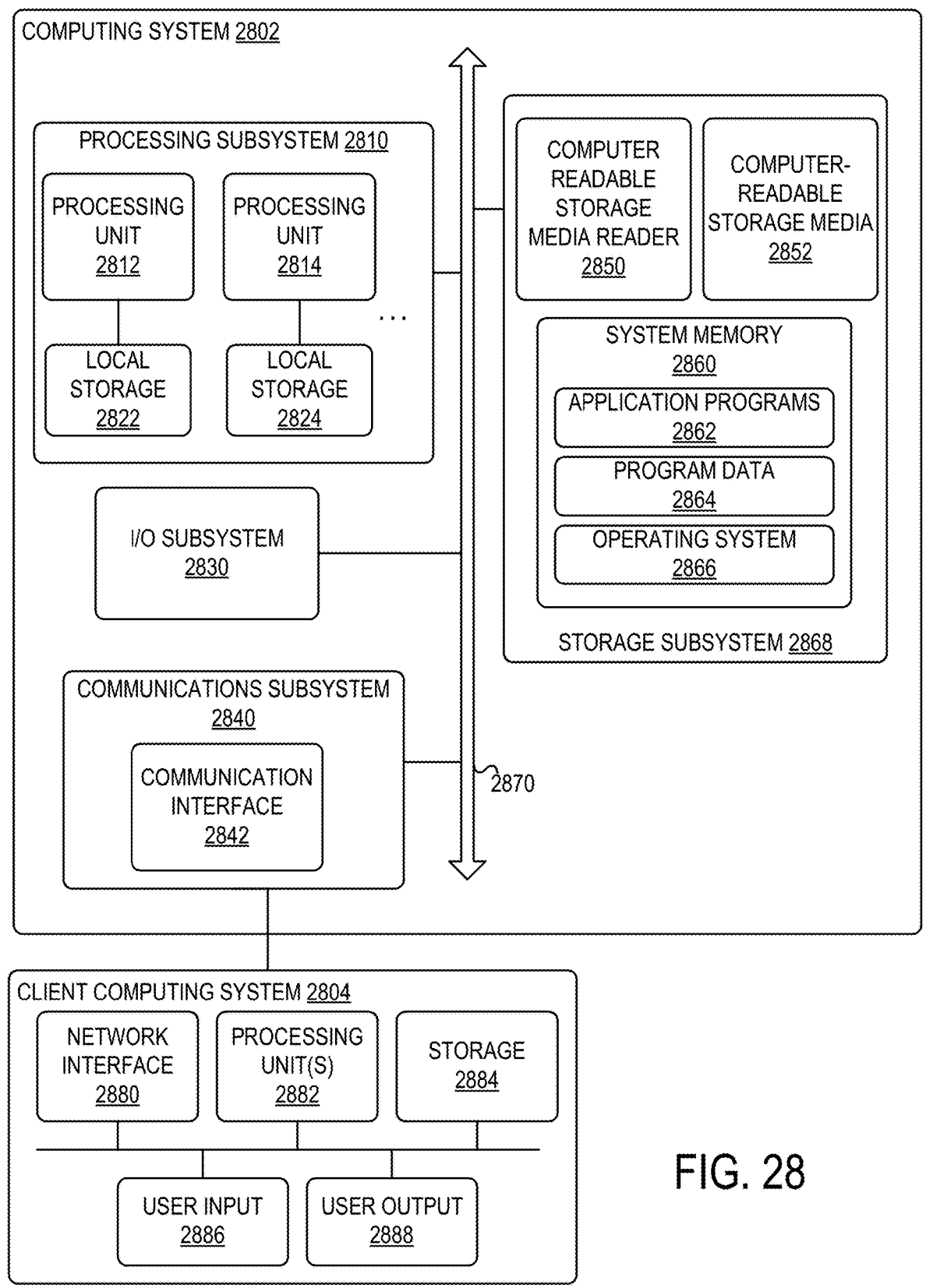
FIG. 28 shows a simplified block diagram of a computing system and a client computing system usable to implement some embodiments.

Various operations described herein may be implemented on computer systems, which may be of generally conventional design. FIG. 28 shows a simplified block diagram of a representative computing system 2802 and client computing system 2804 usable to implement certain embodiments of the present disclosure. In various embodiments, computing system 2802 or similar systems may implement Network analysis system 120, or any other computing system described herein or portions thereof. Client computing system 2804 or similar systems may implement client system 104, or other client systems described herein.

Computing system 2802 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 2802 may include processing subsystem 2810. Processing subsystem 2810 may communicate with a number of peripheral systems via bus subsystem 2870. These peripheral systems may include I/O subsystem 2830, storage subsystem 2868, and communications subsystem 2840.

Bus subsystem 2870 provides a mechanism for letting the various components and subsystems of server computing system 2804 communicate with each other as intended. Although bus subsystem 2870 is shown schematically as a single bus, alternative embodiments of the bus subsystem may utilize multiple buses. Bus subsystem 2870 may form a local area network that supports communication in processing subsystem 2810 and other components of server computing system 2820. Bus subsystem 2870 may be implemented using various technologies including server racks, hubs, routers, etc. Bus subsystem 2870 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 2830 may include devices and mechanisms for inputting information to computing system 2802 and/or for outputting information from or via computing system 2802. In general, use of the term "input device" is intended to include all possible types of devices and mechanisms for inputting information to computing system 2802. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 2802 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 2810 controls the operation of computing system 2802 and may comprise one or more processing units 2812, 2814, etc. A processing unit may include one or more processors, including single core processor or multicore processors, one or more cores of processors, or combinations thereof. In some embodiments, processing subsystem 2810 may include one or more special purpose co-processors such as graphics processors, digital signal processors (DSPs), or the like. In some embodiments, some or all of the processing units of processing subsystem 2810 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 2822, 2824. Any type of processors in any combination may be included in processing unit(s) 2812, 2814.

In some embodiments, processing subsystem 2810 may be implemented in a modular design that incorporates any number of modules (e.g., blades in a blade server implementation). Each module may include processing unit(s) and local storage. For example, processing subsystem 2810 may include processing unit 2812 and corresponding local storage 2822, and processing unit 2814 and corresponding local storage 2824.

Local storage 2822, 2824 may include volatile storage media (e.g., conventional DRAM, SRAM, SDRAM, or the like) and/or non-volatile storage media (e.g., magnetic or optical disk, flash memory, or the like). Storage media incorporated in local storage 2822, 2824 may be fixed, removable or upgradeable as desired. Local storage 2822, 2824 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 2812, 2814 need at runtime. The ROM may store static data and instructions that are needed by processing unit(s) 2812, 2814. The permanent storage device may be a non-volatile read-and-write memory device that may store instructions and data even when a module including one or more processing units 2812, 2814 and local storage 2822, 2824 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 2822, 2824 may store one or more software programs to be executed by processing unit(s) 2812, 2814, such as an operating system and/or programs implementing various server functions such as functions of Network analysis system 120, or any other server(s) associated with Network analysis system 120. "Software" refers generally to sequences of instructions that, when executed by processing unit(s) 2812, 2814 cause computing system 2802 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 2812, 2814. In some embodiments the instructions may be stored by storage subsystem 2868 (e.g., computer readable storage media). In various embodiments, the processing units may execute a variety of programs or code instructions and may maintain multiple concurrently executing programs or processes. At any given time, some or all of the program code to be executed may be resident in local storage 2822, 2824 and/or in storage subsystem including potentially on one or more storage devices. Software may be implemented as a single program or a collection of separate programs or program modules that interact as desired. From local storage 2822, 2824 (or non-local storage described below), processing unit(s) 2812, 2814 may retrieve program instructions to execute and data to process in order to execute various operations described above.

Storage subsystem 2868 provides a repository or data store for storing information that is used by computing system 2802. Storage subsystem 2868 provides a tangible non-transitory computer-readable storage medium for storing the basic programming and data constructs that provide the functionality of some embodiments. Software (programs, code modules, instructions) that when executed by processing subsystem 2810 provide the functionality described above may be stored in storage subsystem 2868. The software may be executed by one or more processing units of processing subsystem 2810. Storage subsystem 2868 may also provide a repository for storing data used in accordance with the present disclosure.

Storage subsystem 2868 may include one or more non-transitory memory devices, including volatile and non-volatile memory devices. As shown in FIG. 28, storage subsystem 2868 includes a system memory 2860 and a computer-readable storage media 2852. System memory 2860 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 2802, such as during start-up, may typically be stored in the ROM. The RAM typically contains data and/or program modules that are presently being operated and executed by processing subsystem 2810. In some implementations, system memory 2860 may include multiple different types of memory, such as static random access memory (SRAM) or dynamic random access memory (DRAM). Storage subsystem 2868 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 2868.

By way of example, and not limitation, as depicted in FIG. 28, system memory 2860 may store application programs 2862, which may include client applications, Web browsers, mid-tier applications, relational database management systems (RDBMS), etc., program data 2864, and one or more operating systems 2866. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 2852 may store programming and data constructs that provide the functionality of some embodiments. Software (programs, code modules, instructions) that when executed by processing subsystem 2810 a processor provide the functionality described above may be stored in storage subsystem 2868. By way of example, computer-readable storage media 2852 may include non-volatile memory such as a hard disk drive, a magnetic disk drive, an optical disk drive such as a CD ROM, DVD, a Blu-Ray® disk, or other optical media. Computer-readable storage media 2852 may include, but is not limited to, Zip® drives, flash memory cards, universal serial bus (USB) flash drives, secure digital (SD) cards, DVD disks, digital video tape, and the like. Computer-readable storage media 2852 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 2852 may provide storage of computer-readable instructions, data structures, program modules, and other data for computing system 2802.

In certain embodiments, storage subsystem 2868 may also include a computer-readable storage media reader 2850 that may further be connected to computer-readable storage media 2852. Together and, optionally, in combination with system memory 2860, computer-readable storage media 2852 may comprehensively represent remote, local, fixed, and/or removable storage devices plus storage media for storing computer-readable information.

In certain embodiments, computing system 2802 may provide support for executing one or more virtual machines. Computing system 2802 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 2802. Accordingly, multiple operating systems may potentially be run concurrently by computing system 2802. Each virtual machine generally runs independently of the other virtual machines.

Communication subsystem 2840 provides an interface to other computer systems and networks. Communication subsystem 2840 serves as an interface for receiving data from and transmitting data to other systems from computing system 2802. For example, communication subsystem 2840 may enable computing system 2802 to establish a communication channel to one or more client computing devices via the Internet for receiving and sending information from and to the client computing devices.

Communication subsystem 2840 may support both wired and/or wireless communication protocols. For example, in certain embodiments, communication subsystem 2840 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 2840 may provide wired network connectivity (e.g., Ethernet) in addition to or instead of a wireless interface.

Communication subsystem 2840 may receive and transmit data in various forms. For example, in some embodiments, communication subsystem 2840 may receive input communication in the form of structured and/or unstructured data feeds, event streams, event updates, and the like. For example, communication subsystem 2840 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 2840 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 2840 may also be configured to output the structured and/or unstructured data feeds, event streams, event updates, and the like to one or more databases that may be in communication with one or more streaming data source computers coupled to computing system 2802.

Communication subsystem 2840 may provide a communication interface 2842, e.g., a WAN interface, which may provide data communication capability between the local area network (bus subsystem 2870) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 2802 may operate in response to requests received via communication interface 2842. Further, in some embodiments, communication interface 2842 may connect computing systems 2802 to each other, providing scalable systems capable of managing high volumes of activity. Conventional or other techniques for managing server systems and server farms (collections of server systems that cooperate) may be used, including dynamic resource allocation and reallocation.

Computing system 2802 may interact with various user-owned or user-operated devices via a wide-area network such as the Internet. An example of a user-operated device is shown in FIG. 28 as client computing system 2802. Client computing system 2804 may be implemented, for example, as a consumer device such as a smart phone, other mobile phone, tablet computer, wearable computing device (e.g., smart watch, eyeglasses), desktop computer, laptop computer, and so on.

For example, client computing system 2804 may communicate with computing system 2802 via communication interface 2842. Client computing system 2804 may include conventional computer components such as processing unit(s) 2882, storage device 2884, network interface 2880, user input device 2886, and user output device 2888. Client computing system 2804 may be a computing device implemented in a variety of form factors, such as a desktop computer, laptop computer, tablet computer, smart phone, other mobile computing device, wearable computing device, or the like.

Processing unit(s) 2882 and storage device 2884 may be similar to processing unit(s) 2812, 2814 and local storage 2822, 2824 described above. Suitable devices may be selected based on the demands to be placed on client computing system 2804; for example, client computing system 2804 may be implemented as a "thin" client with limited processing capability or as a high-powered computing device. Client computing system 2804 may be provisioned with program code executable by processing unit(s) 2882 to enable various interactions with computing system 2802 of a message management service such as accessing messages, performing actions on messages, and other interactions described above. Some client computing systems 2804 may also interact with a messaging service independently of the message management service.

Network interface 2880 may provide a connection to a wide area network (e.g., the Internet) to which communication interface 2840 of computing system 2802 is also connected. In various embodiments, network interface 2880 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 2886 may include any device (or devices) via which a user may provide signals to client computing system 2804; client computing system 2804 may interpret the signals as indicative of particular user requests or information. In various embodiments, user input device 2886 may include any or all of a keyboard, touch pad, touch screen, mouse or other pointing device, scroll wheel, click wheel, dial, button, switch, keypad, microphone, and so on.

User output device 2888 may include any device via which client computing system 2804 may provide information to a user. For example, user output device 2888 may include a display to display images generated by or delivered to client computing system 2804. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 2888 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 2812, 2814 and 2882 may provide various functionality for computing system 2802 and client computing system 2804, including any of the functionality described herein as being performed by a server or client, or other functionality associated with message management services.

It will be appreciated that computing system 2802 and client computing system 2804 are illustrative and that variations and modifications are possible. Computer systems used in connection with embodiments of the present disclosure may have other capabilities not specifically described here. Further, while computing system 2802 and client computing system 2804 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

While the present disclosure has been described with respect to specific embodiments, one skilled in the art will recognize that numerous modifications are possible. For instance, although specific processes are described with reference to FIGS. 8 and 9, other processes may be implemented. Embodiments of the present disclosure may be realized using a variety of computer systems and communication technologies including but not limited to specific examples described herein.

Embodiments of the present disclosure may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the present disclosure has been described with respect to specific embodiments, it will be appreciated that the present disclosure is intended to cover all modifications and equivalents within the scope of the following claims.

What is claimed is:

1. A method comprising, at a computer system:
   accessing network data from one or more data sources, wherein the network data includes Domain Name System (DNS) data;
   determining a plurality of attributes associated with the network data during a first time period;
   receiving an input selecting a specified attribute of the plurality of attributes, the input received to selectively monitor network activity associated with the specified attribute;
   generating a plurality of data sets based on a portion of the network data having the specified attribute during the first time period, wherein each of the plurality of data sets corresponds to a different one of a plurality of time intervals within the first time period;
   computing information about the network activity associated with the specified attribute for each data set in a group of data sets that are included in the plurality of data sets, wherein the information about the network activity is computed for a set of time intervals in the plurality of time intervals, wherein each data set in the group of data sets corresponds to a different time interval in the set of time intervals, and wherein the information computed for each data set in the group of data sets includes a value indicating a measure of occurrences of an event related to the network activity during the different time interval corresponding to that data set;
   generating a graphical interface that displays the information including the value indicating the measure of occurrences of the event related to the network activity corresponding to each data set in the group of data sets, wherein the information for the set of time intervals is displayed according to a second time period defined by the set of time intervals, wherein the graphical interface includes a plurality of interactive elements, and wherein each interactive element of the plurality of interactive elements displays a visual indication based on the information about the network activity computed for a different data set in the group of data sets, wherein the plurality of interactive elements are rendered in the graphical interface as a grid of tiles, each tile corresponding to one of the plurality of interactive elements, the value indicating the measure of occurrences of the event related to the network activity corresponding to each data set displayed within the corresponding tile, and wherein the grid of tiles is arranged according to a scale defined based on the set of time intervals within the first time period;
   causing the graphical interface to display at a device.

2. The method of claim 1, wherein the DNS data includes passive DNS data, active DNS data, or a combination thereof.

3. The method of claim 1, wherein the network data includes secure sockets layer (SSL) data and domain registration data.

4. The method of claim 1, wherein determining the portion of the network data includes identifying the DNS data having the attribute in the network data.

5. The method of claim 1, wherein the second time period is a subset of the first time period, and wherein each of the plurality of time intervals corresponds to a different data set within the plurality of data sets for the first time period.

6. The method of claim 1, wherein the second time period within the first time period, and wherein the second time period is configurable by a user.

7. The method of claim 1, wherein one or more of the plurality of interactive elements are displayed in the graphical interface as having one or more visual representations to provide the indication based on the information computed for each data set in the group of data sets corresponding to one or more interactive elements.

8. The method of claim 7, wherein the first interactive element is displayed having an indication about a measure of occurrences of an event based on the network activity determined from the first information.

9. The method of claim 1, further comprising:
   adjusting the network data to a format for the first time period based on first network data and second network data included in the network data, wherein the first network data has a first format, and wherein the second network data has a second format that is different from the first format.

10. A method comprising, at a computer system:
    accessing network data from one or more data sources, wherein the network data includes data related to communication using one or more Internet protocols;
    determining, based on the network data, a portion of the network data associated with a particular Internet domain name during a first time period;
    generating a plurality of data sets based on the portion of the network data associated with a particular Internet domain name during the first time period, wherein each of the plurality of data sets corresponds to a different one of a plurality of time intervals within the first time period;

computing information about network activity for each data set in a group of data sets that are included in the plurality of data sets, wherein the information about the network activity is computed for a set of time intervals in the plurality of time intervals, wherein each data set in the group of data sets corresponds to a different time interval in the set of time intervals, and wherein the information computed for each data set in the group of data sets includes a value indicating a number of unique Internet Protocol (IP) addresses that have been resolved for the particular Internet domain name during the different time interval corresponding to that data set;

generating a graphical interface that displays the information including the value indicating the number of unique Internet Protocol (IP) addresses that have been resolved for the particular Internet domain name corresponding to each data set in the group of data sets, wherein the information for the set of time intervals is displayed according to a second time period defined by the set of time intervals, wherein the graphical interface includes a plurality of interactive elements, and wherein each interactive element of the plurality of interactive elements displays a visual indication based on the information about the network activity computed for a different data set in the group of data sets, wherein the plurality of interactive elements are rendered in the graphical interface as a grid of tiles, each tile corresponding to one of the plurality of interactive elements, the value indicating the number of unique Internet Protocol (IP) addresses that have been resolved for the particular Internet domain name corresponding to each data set in the group of data sets displayed within the corresponding tile, and wherein the grid of tiles is arranged according to a scale defined based on the set of time intervals within the first time period; and causing the graphical interface to display at a device.

11. The method of claim 10, further comprising:
receiving an input of an interaction with a first interactive element of the plurality of interactive elements;
based on the input, obtaining, from a first data set in the group of data sets corresponding to the first interactive element, first information about each occurrence of the event related to the network activity corresponding to a first time interval for the first data set for which the measure of occurrences is computed; and
updating the graphical interface to display first information in a graphical display that is overlaid on the graphical interface and adjacent to the first interactive element.

12. The method of claim 10, wherein one or more of the plurality of interactive elements are displayed in the graphical interface as having one or more visual representations to provide the indication based on the information computed for each data set in the group of data sets corresponding to one or more interactive elements, and wherein the one or more visual representations include a graphical appearance that is represented based on the measure of occurrences of the event related to the network activity for the data set corresponding to the one or more interactive elements.

13. The method of claim 12, wherein a first interactive element of the one or more interactive elements is displayed with a first portion and a second portion, wherein the first portion has the graphical appearance that indicates the measure of occurrences of the event related to the network activity for the data set corresponding to the first interactive element, wherein the second portion is interactive to cause a portion of the information to be displayed in a graphical display that is overlaid and adjacent to the first interactive element, the portion of the information indicating each occurrence of the event related to the network activity for the data set corresponding to the first interactive element.

14. The method of claim 10, wherein the method further comprises:
based on interaction with a first interactive element of the plurality of interactive elements, updating the graphical interface to display first information about each distinct IP address that has been resolved for the Internet domain name corresponding to a first time interval for the first data set for which the measure of IP addresses have been resolved for the Internet domain name, and wherein the first information is displayed in a graphical display that is overlaid on the graphical interface and adjacent to the first interactive element.

15. The method of claim 14, wherein each data set in the group of data sets indicates one or more IP addresses that have been resolved for the Internet domain name for a different time interval in the set of time intervals corresponding to the data set.

16. The method of claim 1, wherein the specified attribute is an Internet protocol (IP) address, and wherein the information the network activity includes a value indicating a measure of Internet domain names resolved for the IP address.

17. The method of claim 16, wherein each data set in the group of data sets indicates one or more Internet domain names that have been resolved for the IP address for a different time interval in the set of time intervals corresponding to the data set.

18. A system comprising:
one or more processors; and
a memory accessible to the one or more processors, the memory storing one or more instructions that, upon execution by the one or more processors, causes the one or more processors to perform operations to:
access network data from one or more data sources, wherein the network data includes data related to communication using one or more Internet protocols;
determine a plurality of attributes associated with the network data during a first time period;
receive an input selecting a specified attribute of the plurality of attributes, the input received to selectively monitor network activity associated with the specified attribute;
generate a plurality of data sets based on a portion of the network data having the specified attribute during the first time period, wherein each of the plurality of data sets corresponds to a different one of a plurality of time intervals within the first time period;
compute information about the network activity associated with the specified attribute for each data set in a group of data sets that are included in the plurality of data sets, wherein the information about the network activity is computed for a set of time intervals in the plurality of time intervals, wherein each data set in the group of data sets corresponds to a different time interval in the set of time intervals, and wherein the information computed for each data set in the group of data sets includes a value indicating a number of unique Internet Protocol (IP) addresses that have been resolved for the particular Internet domain name during the different time interval corresponding to that data set;

generate a graphical interface that displays the information including the value indicating the number of unique Internet Protocol (IP) addresses that have been resolved for the particular Internet domain name corresponding to each data set in the group of data sets, wherein the information for the set of time intervals is displayed according to a second time period defined by the set of time intervals, wherein the graphical interface includes a plurality of interactive elements, and wherein each interactive element of the plurality of interactive elements displays a visual indication based on the information about the network activity computed for a different data set in the group of data sets, wherein the plurality of interactive elements are rendered in the graphical interface as a grid of tiles, each tile corresponding to one of the plurality of interactive elements, the value indicating the number of unique Internet Protocol (IP) addresses that have been resolved for the particular Internet domain name corresponding to each data set in the group of data sets displayed within the corresponding tile, and wherein the grid of tiles is arranged according to a scale defined based on the set of time intervals within the first time period; and cause the graphical interface to display at a device.

19. The system of claim 18, wherein the one or more instructions that, upon execution by the one or more processors, further causes the one or more processors to perform operations to:

receive, from the device, a request to display a portion of the network data for the specified attribute during the second time period, wherein causing the graphical interface to display at the device includes sending the graphical interface to the device, and wherein the device displays the graphical interface sent by the system to the device.

20. A non-transitory computer-readable storage medium storing one or more instructions that are executable by one or more processors to cause the one or more processors to:

access network data from one or more data sources, wherein the network data includes data related to communication using one or more Internet protocols;

determine a plurality of attribute s associated with the network data during a first time period;

receive an input selecting a specified attribute of the plurality of attributes, the input received to selectively monitor network activity associated with the specified attribute;

generate a plurality of data sets based on a portion of the network data having the specified attribute during the first time period, wherein each of the plurality of data sets corresponds to a different one of a plurality of time intervals within the first time period;

compute information about the network activity associated with the specified attribute for each data set in a group of data sets that are included in the plurality of data sets, wherein the information about the network activity is computed for a set of time intervals in the plurality of time intervals, wherein each data set in the group of data sets corresponds to a different time interval in the set of time intervals, and wherein the information computed for each data set in the group of data sets includes a value indicating a number of unique Internet Protocol (IP) addresses that have been resolved for the particular Internet domain name during the different time interval corresponding to that data set;

generate a graphical interface that displays the information including the value indicating the number of unique Internet Protocol (IP) addresses that have been resolved for the particular Internet domain name corresponding to each data set in the group of data sets, wherein the information for the set of time intervals is displayed according to a second time period defined by the set of time intervals, wherein the graphical interface includes a plurality of interactive elements, and wherein each interactive element of the plurality of interactive elements displays a visual indication based on the information about the network activity computed for a different data set in the group of data sets, wherein the plurality of interactive elements are rendered in the graphical interface as a grid of tiles, each tile corresponding to one of the plurality of interactive elements, the value indicating the number of unique Internet Protocol (IP) addresses that have been resolved for the particular Internet domain name corresponding to each data set in the group of data sets displayed within the corresponding tile, and wherein the grid of tiles is arranged according to a scale defined based on the set of time intervals within the first time period; and cause the graphical interface to display at a device.

21. The method of claim 1, wherein the graphical interface further includes a heat map layout overlaid on the grid of tiles displayed according to the scale defined based on the set of time intervals, the tile having a visual appearance that displays the indication based on the information about the network activity computed for the different data set corresponding to the tile, and wherein the visual appearance is a color that is represented based on the measure of occurrences of the event related to the network activity computed for the different time interval for the different data set.

22. The method of claim 1, further comprising:

receiving an input of an interaction with a first interactive element of the plurality of interactive elements;

based on the input, obtaining, from a first data set in the group of data sets corresponding to the first interactive element, first information about each occurrence of the event related to the network activity corresponding to a first time interval for the first data set for which the measure of occurrences is computed, the first information includes one or more possibly malicious IP addresses resolved for a particular domain name and an indication of a first appearance of any of the one or more possibly malicious IP addresses; and updating the graphical interface to display the first information in a graphical display that is overlaid on the graphical interface and adjacent to the first interactive element.

* * * * *